United States Patent
Breidenbach et al.

(10) Patent No.: US 12,489,649 B1
(45) Date of Patent: Dec. 2, 2025

(54) METHOD AND APPARATUS FOR PROVIDING SECURE INFORMATION TO A DECENTRALIZED COMPUTING ENVIRONMENT

(71) Applicant: SmartContract Chainlink Limited SEZC, Grand Cayman (KY)

(72) Inventors: Lorenz Breidenbach, Grand Cayman (KY); Christian Cachin, Grand Cayman (KY); Chrysoula Stathakopoulou, Grand Cayman (KY)

(73) Assignee: SmartContract Chainlink Limited SEZC, Grand Cayman (KY)

( * ) Notice: Subject to any disclaimer, the term of this patent is extended or adjusted under 35 U.S.C. 154(b) by 0 days.

(21) Appl. No.: 18/649,046

(22) Filed: Apr. 29, 2024

Related U.S. Application Data

(63) Continuation-in-part of application No. 17/678,769, filed on Feb. 23, 2022, now Pat. No. 12,074,853.

(60) Provisional application No. 63/152,804, filed on Feb. 23, 2021.

(51) Int. Cl.
*G06F 16/00* (2019.01)
*G06F 16/2458* (2019.01)
*H04L 9/00* (2022.01)
*G06F 16/248* (2019.01)
*G06F 16/27* (2019.01)

(52) U.S. Cl.
CPC ............ *H04L 9/50* (2022.05); *G06F 16/2471* (2019.01); *G06F 16/248* (2019.01); *G06F 16/27* (2019.01)

(58) Field of Classification Search
CPC ..... H04L 9/50; G06F 16/2471; G06F 16/248; G06F 16/27
See application file for complete search history.

(56) References Cited

U.S. PATENT DOCUMENTS

| | | | |
|---|---|---|---|
| 2020/0074552 A1* | 3/2020 | Shier | G06Q 20/10 |
| 2020/0311312 A1* | 10/2020 | Yu | H04L 9/0897 |
| 2020/0320340 A1 | 10/2020 | Wentz | |
| 2024/0414228 A1 | 12/2024 | Cao et al. | |

OTHER PUBLICATIONS

Berger et al., "OraclesLink: An architecture for secure oracle usage", IEEE, 978-1-7281-8370, pp. 66-72 (Year 2020).

* cited by examiner

*Primary Examiner* — Alexander Khong
(74) *Attorney, Agent, or Firm* — Potomac Law Group, PLLC; Marc S. Kaufman

(57) ABSTRACT

A system and method in which a network of offchain oracle nodes are used to provide dynamic information to consuming smart contracts in a decentralized computing environment. The off-chain oracle network and a corresponding protocol reduces the likelihood of damage from rogue oracles acting in concert. Periodically, the oracle nodes, jointly and in concert, run the protocol to sign a report containing observations from many of the oracles in the network. The report is transmitted to a smart contract C running on a DLT. The smart contract C can validate the report, pay each oracle node that contributed an observation to the report and expose the median, or other calculated value, of the reported values to the on-chain consuming smart contracts.

14 Claims, 7 Drawing Sheets

(Continued on FIG. 2b)

(a) Transition of follower phases (in Φ).

(b) Transition of leader phases (in Λ).

METHOD AND APPARATUS FOR PROVIDING SECURE INFORMATION TO A DECENTRALIZED COMPUTING ENVIRONMENT

RELATED APPLICATION DATA

This application is continuation-in-part of application Ser. No. 17/678,769, filed on Feb. 23, 2022, which claims priority to provisional application Ser. No. 63/152,804, filed Feb. 23, 2021, the entire disclosures of which are incorporated herein by reference.

BACKGROUND

Decentralized computing environments, also known as "Distributed Ledger Technology (DLT), refer to computer networks in which computing devices communicate in a peer-to-peer manner without the need for centralized control. Generally, decentralized computing environments store data on multiple distributed ledger nodes in accordance with a "consensus mechanism" which is used to determine which data can be stored on the ledgers. Because consensus is required, decentralized computing environments can store data accurately and securely without the need for a centralized database controlled by a trusted party.

Distributed ledger technology has been deployed in recent years to provide "trustless" transactions between parties. In other words, DLT allows parties who do not have a trust relationship, or possibly even know each other's identity, to exchange information and conduct various transactions in an accurate manner. This is accomplished because DLT systems record information on a shared ledger, i.e. individual ledgers in the nodes, in a manner that makes it very difficult to change, hack, or cheat the system.

A blockchain is a type of DLT and is essentially a digital ledger of transactions that stores groups of transaction data in blocks. Each block of data contains a record of multiple transactions, and every valid transaction that occurs on the blockchain, is added to a block that is recorded on the nodes. Each block is linked to previous blocks through cryptographic techniques. There are many blockchain protocols, including Bitcoin, Ethereum, Hyperledger, R3 Corda, Quorum, and Cardano.

Executable code, referred to as "smart contracts" can be stored in a DLT system, i.e., "on-chain" in an immutable manner, similar to the manner in which transaction data is stored. This allows smart contracts to provide trustless execution of various functions in an automated manner. However, to be pragmatic, smart contracts often need to receive dynamic data that is not stored on the DLT, i.e., data stored "offchain", such as pricing information and weather information. This data is received from trusted sources of data called "oracles."

For example, a crop insurance policy can be executed by a smart contract to automatically make a payment to any policy holder when precipitation in a specific geographic region is less than a predetermined amount over a specified time. The amount of precipitation can be received from an oracle. Of course, the oracle must be accurate and trusted by the insurer and all insured parties for this insurance to be effective. However, in conventional systems, the need to trust the accuracy of oracles often defeats much of the purpose (e.g., trustless transactions) of DLT systems. The CHAINLINK™ protocol provides a decentralized oracle network that results in reliable, tamper-proof inputs and outputs for complex smart contracts on any blockchain or other DLT system. This has largely solved the "trust problem" of conventional oracles. However, it is still possible that one or more rogue oracles could provide false results, e.g., in what is known as a "Byzantine" attack, to provide inaccurate information to a smart contract to causes the smart contract to act in an undesirable manner.

BRIEF SUMMARY

Disclosed implementations leverage an "off-chain" (i.e., not on the DLT on which the relevant smart contract is executed) oracle protocol to reduce the likelihood of damage from rogue oracles acting in concert. In disclosed implementations, there are n oracles (or nodes) that monitor an off-chain data stream. A typical example of such a data stream is an API reporting a price feed such as a conversions rate between ETH-USD. Periodically, the oracles, jointly and in concert, run the protocol to sign a report containing observations from many of the n oracles. Once a report is produced successfully, one or multiple transmitters sampled from the oracle set transmit the report to a smart contract C running on a "main" (e.g., a blockchain such as o be Ethereum). While the example of an Ethereum blockchain is discussed herein, no specific features of Ethereum are necessarily used by the off-chain reporting protocol and thus the protocol can be used in connection with any decentralized environment. The smart contract C can validate the report, pay each oracle that contributed an observation to the report (e.g., through an onchain transaction), and expose the median, or other calculated value, of the reported values to consuming smart contracts on-chain. The first transmitter to successfully transmit the report to C can be paid a bonus to make up for the transaction fees, such as Ethereum "gas" fees, incurred during transmission of the report.

The disclosed implementations include a protocol that is resilient to different kinds of failures. Oracles may become Byzantine out of malice or due to buggy code. The chosen security model limits only the number of faulty oracles. In practice, crash failures occur much more often. For example, networks go down or exhibit erratic behavior, data centers lose power, or software crashes upon attempting to dereference a nil pointer. In any case, an otherwise correct oracle or its network may be temporarily disrupted. When the oracle recovers and starts acting correctly again, it can rejoin the protocol quickly and without manual intervention. Additional measures are in place to mitigate such intermittent crash failures.

The disclosed implementations utilize design parameters that permit simple implementation. Communication between the oracles and computation performed by the oracles happens off-chain and thus can be (almost) free of network transaction costs. In contrast, communication with the smart contract C could require hefty fees depending on the on-chain environment. The disclosed implementations minimize transaction fees, by moving as much computation as possible off-chain.

Disclosed implementations minimize the time between the initiation of the signing protocol and the inclusion of the resulting transaction on the blockchain by smart contract C. For example, the data posted to Cis for a decentralized finance (DeFi) trading platform, the data must be current. Assuming real-world internet latencies, the protocol should produce a report within a few seconds. Typically, this time will be dominated by the time it takes to complete transmission of the resulting report to smart contract C.

Disclosed implementations include and offchain reporting protocol that is a Byzantine fault tolerant distributed protocol run amongst a network of n oracles (or nodes). The protocol repeatedly gathers observations from participating oracles and aggregates them into consensus outcomes. From each outcome, multiple reports are derived and attested by a quorum of oracles (through their signatures). The attested reports are then transmitted by the oracles to an oracle smart contact C, running on a blockchain, which could be Ethereum or any other blockchain which supports smart contracts. The contract validates the reports and exposes their contents to consuming contracts.

The offchain reporting protocol can execute many different kinds of functions through reporting plugins. A reporting plugin is a stateful object, implementing functions that define how individual oracles make observations, how the observations are aggregated into an outcome, how the outcome is converted into a report, whether the report should be transmitted to C, and more. For a given instance of the protocol, all oracles are assumed to run the same reporting plugin. Whenever we mention observations, aggregate outcomes, and reports in this document, they are meant in the generic sense, without taking into account their specific meaning in the context of a reporting-plugin implementation. The logic of each reporting plugin is executed offchain on the oracles participating in the protocol. The smart contract C is the onchain counterpart of the reporting plugin. Its logic is executed onchain.

For the offchain reporting protocol, logic can be expressed following the structure of the reporting plugin interface and the protocol acts as a distributed, Byzantine fault tolerant runtime for that logic without being aware of what is being observed, aggregated, and transmitted. The disclosed implementations achieve the following goals.

Security & Reliability: The protocol is resilient to different kinds of failures. Oracles may become Byzantine out of malice or due to buggy code. The chosen security model limits only the number of faulty oracles, not the types of faults. The design should be simple to implement in a real-world system.

Low transaction fees: Communication between the oracles and computation performed by the oracles happens offchain and is therefore (almost) free. In contrast, communication with C, and computation performed by it, require transactions on the blockchain, and are many orders of magnitude more expensive. For example, a single Ethereum transaction can easily cost tens or hundreds of dollars. Disclosed implementations can minimize transaction fees, even if this results in protocol with higher offchain computation and networking requirements.

Low latency: The design minimizes the delay between observations being made and transmission of the corresponding attested report, as well as the delay incurred by generation of new outcomes that causally depend on the previous outcome. One of the main ways in which we achieve this is by making the protocol responsive and reducing the number of network trips, since network latency is the dominant constituent of protocol latency in the WAN settings in which the protocol operates.

Flexibility: The protocol defines a common foundation on top of which many different use cases can be built by configuring the protocol appropriately and "plugging in" use case specific logic through the reporting plugin and oracle contract. Implementers should not need to be familiar with the internals of the protocol, but only with the reporting plugin interface.

One disclosed implementation is a method for providing secure information from a remote network to a decentralized computing environment, the method comprising: executing a smart contract on plural on-chain nodes of the decentralized computing environment, wherein the smart contract specifies a network of plural oracle nodes of an off-chain remote computing network, wherein the offchain remote computing network includes at least one of a centralized or a decentralized network and wherein the oracle nodes each have a collection of keys that define an identity of the corresponding node; periodically receiving, by each oracle node, at least one observed value from the offchain remote computing network, wherein the at least one observed value corresponds to the secure information; wherein the oracle nodes communicate with each other and with the smart contract using a report protocol defined by at least one reporting plugin module, wherein each of the at least one reporting plugin modules is a stateful object, and wherein the at least one reporting plugin module defines four algorithms including; a pacemaker algorithm configured to periodically initiate a new epoch that triggers an instance of the outcome generation algorithm; an outcome generation algorithm configured to aggregate the observed values of the oracle nodes into outcomes; a report attestation algorithm configured to convert the outcomes into a report; and a transmission algorithm configured to selectively transmit the report to the smart contract, the report; and exposing by the smart contract, the report to consuming smart contracts executing on the decentralized computing environment.

BRIEF DESCRIPTION OF THE DRAWING

The foregoing summary, as well as the following detailed description of the invention, will be better understood when read in conjunction with the appended drawing. For the purpose of illustrating the invention, the drawing shows various illustrative embodiments. It should be understood, however, that the invention is not limited to the precise arrangements and instrumentalities shown. In the drawings:

FIGS. 2a and 2b are a schematic representation of execution of the report generation protocol in which FIG. 2b is a continuation of the illustration of workflow from FIG. 2a.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Figure 1:
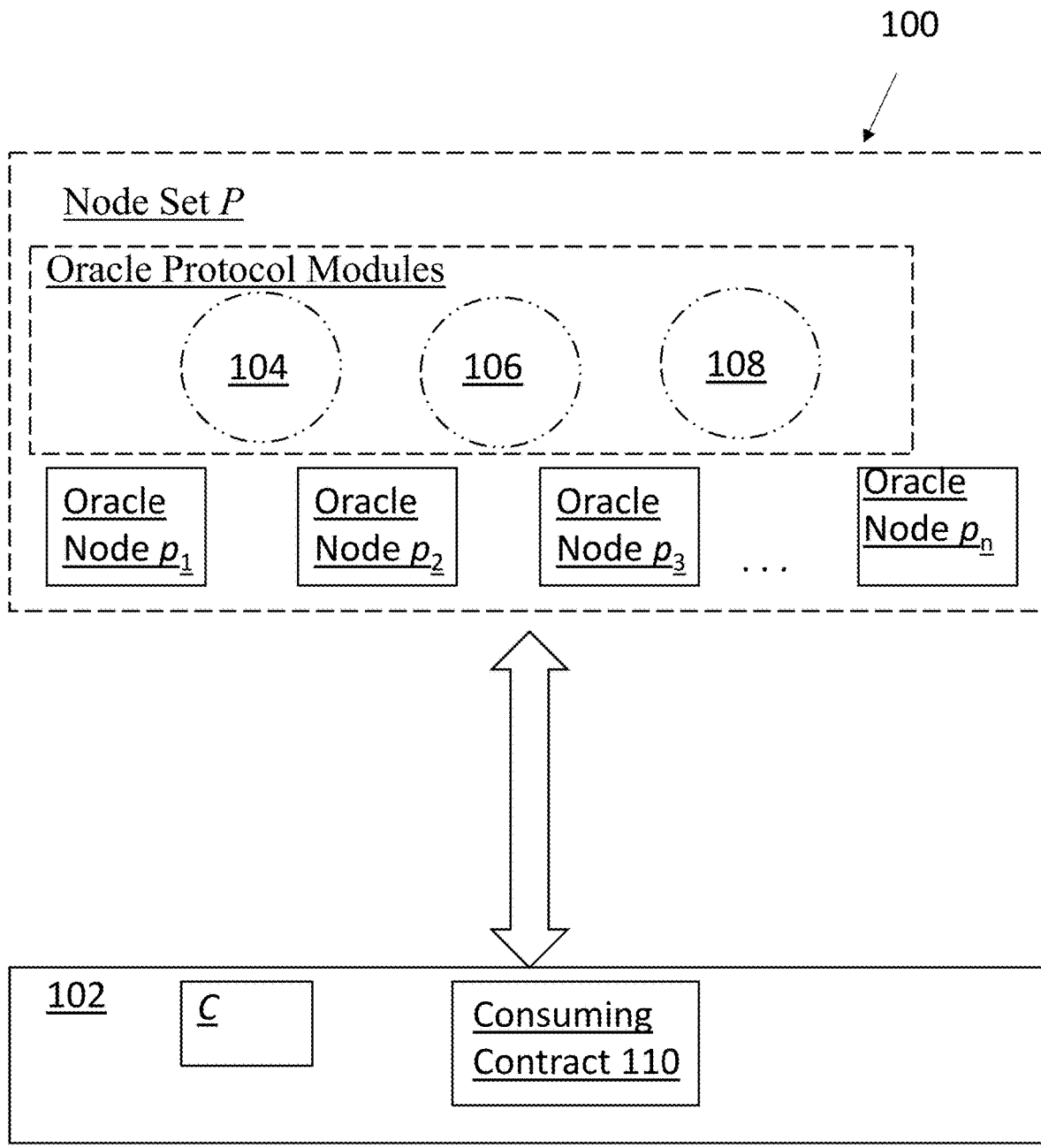
FIG. 1 is a schematic block diagram of a computing system in accordance with disclosed implementations.

FIG. 1 illustrates a computer system 100 in accordance with disclosed implementations. The system consists of n oracles P={$p_1, \ldots, p_n$}. Each of $p_1, \ldots, p_n$ are also referred to as "nodes" herein. The oracles may send messages to each other over an off-chain network using the oracle protocol described below. Each node can be identified by their network endpoints, e.g., a certificate on their cryptographic key material, which allows the nodes to authenticate to each other. The set P of oracles is determined by an oracle smart contract C recorded and executable on a decentralized environment, such as blockchain 102 in FIG. 1. If it becomes necessary to change the oracle set that performs reporting, an oracle list in smart C contract can changed by its owner and the off-chain oracle protocol can be restarted with the new set of oracles. Smart contract C is described in greater detail below.

Each oracle $p_i$ makes observations of a value, such as a price, over time. The value can be read periodically or constantly. The oracle protocol and its security analysis do not rely on any specific structure or distribution over these observations. However, the oracle protocol ensures that the on-chain reports include the real observations of sufficiently many correct parties. Such reports, and how they are generated using the protocol, are described in greater detail below.

Any $f<n/3$ oracles may exhibit Byzantine faults, which means that they may behave arbitrarily and as if controlled by an imaginary adversary. All non-faulty oracles are referred to herein as "honest" or "correct." Consequently, for $n\leq 3$, all oracles most be correct for the protocol to function correctly. For stating formal security guarantees, faults may occur adaptively, where the adversary can choose the faulty nodes on the fly. In disclosed implementations, once faulty, a node remains faulty for the entire duration of the protocol. It is expected that the protocol operates usually with at least $n=3f+1$ since this provides optimal resilience. This failure assumption also covers network failures and crashes, which may or may not be introduced in a nefarious manner. This assumption also means that no more than f nodes may become isolated from the network or crash.

However, transient "benign" faults are permitted. For example, a correct node may crash and become unresponsive for a period of time, or it may become unreachable from some or all other correct nodes (such as during a network partition). When the correct node resumes operation after recovering, it restores some state from local persistent storage and will participate in the protocol again correctly. The model implemented by the oracle protocol achieves the following. If f oracles are Byzantine-faulty and c oracles are benign-faulty with $f<n/3$ but $f+c\geq n/3$ at any point in time during the protocol execution, then: (a) the protocol may lose liveness, but (b) the protocol satisfies the safety properties. For supporting this refined model and thereby increasing the resilience against crashes, some local state of each oracle p is always maintained on persistent storage.

The goal of the oracle protocol of disclosed implementations is to repeatedly produce reports which are recorded by the smart contract C on the DLT, such as blockchain 102 (which can be an Ethereum blockchain). A report is signed by a sufficient number of oracles and can consist of a sorted list with recent observed values from a plurality of oracles along with cryptographic signatures of the oracles. The report is submitted to C. The code of C, in turn, verifies the signatures of the oracles, checks that the list of observations is sorted, records which oracles contributed, and calculates an aggregation of the observations. The aggregation can be, for example, a median of the values in the report. The aggregation is stored as the reported value on the blockchain. While the median of the observations is used in this example, any other statistical value that represents the collective value of the observations can be used, along with any appropriate weighting or other processing, as the aggregation. The oracles contributing to the report can receive a payout. Using the median among more than 2f observations as the aggregation ensures that the reported value is plausible in the sense that faulty oracles cannot move it outside the range of observations submitted by correct oracles.

Under the assumption that the protocol is run by $n>3f$ oracles, the maximum resilience is achieved when $n=3f+1$. When $n>>3f$, i.e., when the owner of C assumes fewer than the maximally possible number of oracles would misbehave, then multiple options arise for the number $\lambda$ of observations that constitute a report:

(a) Setting $\lambda=2f+1$ takes only the minimally needed number of observation values into a report for the median to be plausible and results in the lowest payout. This choice is correct under the assumption that no more than f oracles report wrong observations. However, this choice does not gracefully degrade when $n>>3f$ and the assumption on f is violated.

(b) With $\lambda>(n+f)/2$ observations, the coverage of the observations included in a report among those made by all oracles is broader than in option (a). In particular, this choice of $\lambda$, which corresponds to the size of a Byzantine quorum, ensures that for every two reports, there is least one correct oracle that contributed an observation to both.

(c) Using $\lambda=n-f$ observations ensures that reports are produced always by as many oracles as possible and that no correct oracle is left behind. This means that the reported value is determined from the largest number of measured data values and gives the correct oracles the biggest chance to contribute, compared to the other options. The cost arising is also the largest because n−f oracles receive payout.

Due to the number of observations that must be included in a report, with average network behavior, option (a) performs best, option (b) follows but takes longer, and option (c) results in the slowest performance because it must wait for the largest number of messages. Hence, the choice of $\lambda$ represents a tradeoff between the total cost of the payouts, the performance of the protocol that collects the observations, and the robustness of the reported value. The example of the report generation protocol of the disclosed implementations uses option (a) with $\lambda=2f+1$. In practice, adhering to $n=3f+1$ tolerates the maximum number of faulty oracles and obviates the need for choosing between options (a)-(c) because they all reduce to $\lambda=2f+1$.

In accordance with disclosed embodiments, the oracle protocol can use public-key digital signatures and pseudorandom functions (PRF). The standard ECDSA scheme can be used for digital signatures. A PRF may be implemented by HMACSHA256 or by Keccak256 (e.g., by simply prepending the key to the message). The timing of the network model can be aligned with a partially synchronous model (such as DLS88). To defend against distributed denial of service (DDOS) attacks by outside entities, the oracles can communicate over a private computer network. "Partial synchrony" as used herein, means that the network is asynchronous, and the clocks of the nodes (oracles) are not synchronized up to some point in time called "global stabilization time" (GST). After GST, the network behaves synchronously, the clocks behave synchronously, and all messages between correct nodes are delivered within some bounded delay $\Delta$, and this remains so for the remainder of the protocol instance execution. In practice, a protocol may alternate multiple times between asynchronous and synchronous periods. Liveness is only ensured for periods of synchrony.

As a pragmatic choice, the maximal communication delay $\Delta$ can be a constant configured into the protocol. A discussion of the timeout values used in some implementations is set forth below. The oracles may send point-to-point messages to each other over an unreliable network. All connections are authenticated and encrypted. In other words, each oracle can authenticate every other oracle based on the list of oracles as determined by C on blockchain 102. Messages sent between correct oracles are not necessarily delivered in the same order in which they were sent.

As noted above, it is possible for a network partition to temporarily isolate a large number of nodes. Such partitions can model node crashes and eventual reboots, as well. However, since nodes keep retrying messages, all messages among correct nodes get through eventually, once any impeding network asynchrony passes.

As noted above, oracle reports are periodically sent to contract C. The oracle protocol can be structured into three protocols, called "pacemaker" (implemented by pacemaker module 104), "report generation" (implemented by report generation module 106), and "transmission", (implemented by transmission module 108). Note that modules 104, 106, and 108 are illustrated schematically in FIG. 1 and are shown as residing external to nodes $p_1$ to $p_n$. However, as will be described below. The function of the modules can be implemented by the nodes collectively and in concert. The term "module", as used herein, refers to software executing (or executable) on computer hardware to accomplish the described functions.

Pacemaker module 104 drives timing of the report generation process, which is structured into epochs. In each epoch, there is a designated leader oracle that drives a report generation protocol for the epoch. This concept is similar to some protocols for consensus. However, the pacemaker protocol described herein does not ensure consensus and relies on smart contract C for resolving ambiguities that may occur due to transitions across epochs.

Figure 2A:
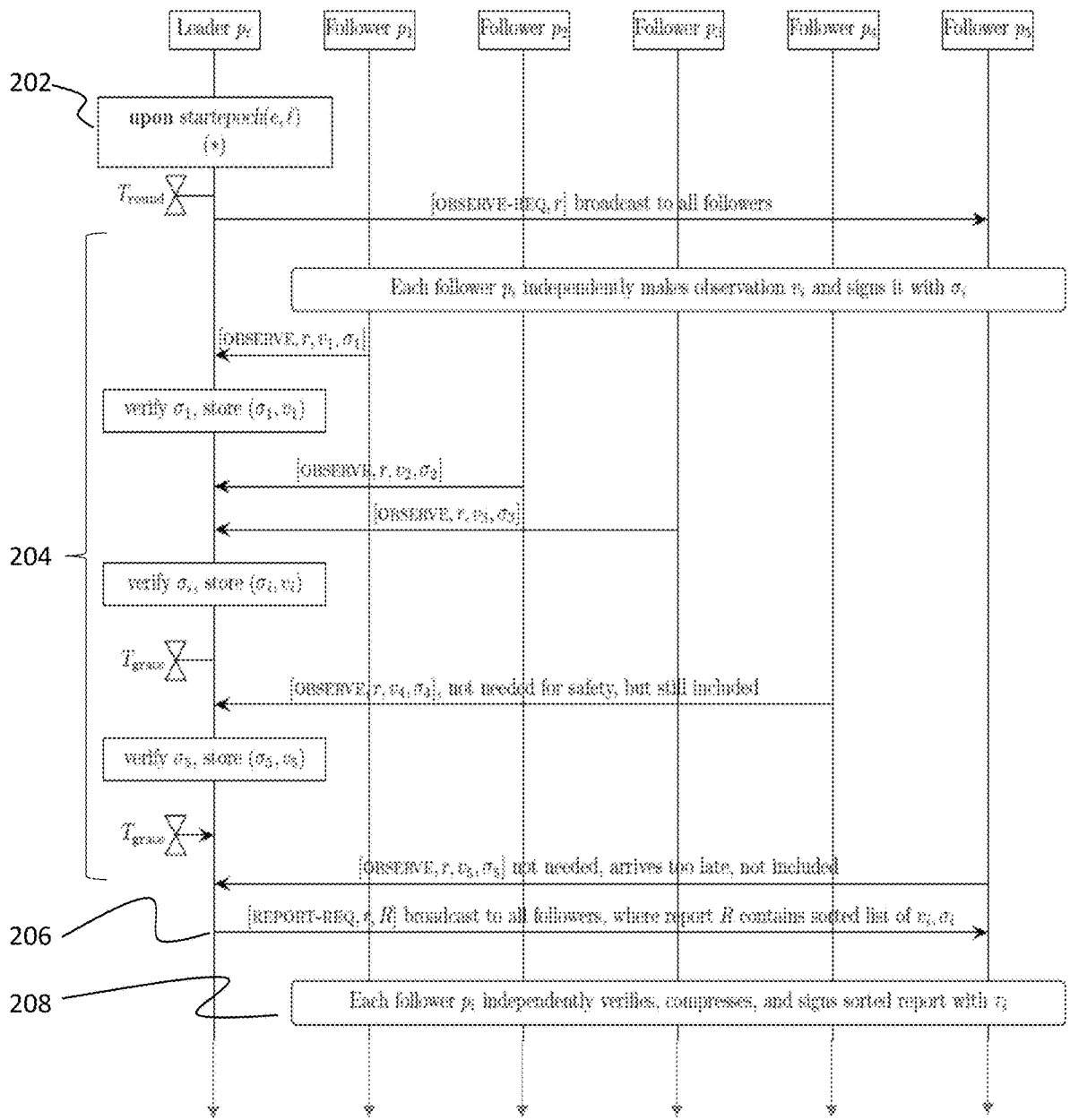

FIGS. 2 and 2a illustrate the data flow accomplished by the protocol of pacemaker module 104 and report generation module 106. Pacemaker module 104 periodically initiates a new epoch and a corresponding instance of the report generation protocol. Every report generation instance has a designated leader. At 202 of FIG. 2a, pacemaker module 104 emits a startepoch event that is sent to a leader oracle node $p_l$ (selected from amongst oracle $p_1 \ldots p_n$), which triggers the leader oracle node to start a "round" of the report generation protocol.

Rounds and leader selection are discussed in detail below. Every report generation protocol instance executed by report generation module 106 corresponds to an epoch and has a unique identifier e and a leader node $p_1$. A new epoch can be started whenever a sufficient predetermined number of oracles have determined that a new leader is needed. The report generation protocol of an epoch is structured into rounds. In each round, the protocol gathers observations and, if conditions for proceeding are met, the protocol generates a signed oracle report.

Pacemaker module 104 may also abort the currently running report generation instance if it does not observe enough progress. To this end, pacemaker module 104 receives progress events from the current report generation instance. Every oracle runs a timer with timeout duration: $\Delta_{progress}$ that serves to watch the epoch leader's performance and every progress event resets that timer. When the timer expires, the oracle concludes that the current leader was not performing correctly and has not produced a valid report that may be sent to smart contract C. The oracle then moves to initiate a new epoch with another report generation protocol instance and a different leader. Neither pacemaker module 104 nor report generation module 106 actually sends out the report to smart contract C. This task is accomplished by transmission module 108 as described below.

At 204 of FIG. 2a pacemaker module 104 observes the progress only via the report generation instance through the progress events. Thus, $\Delta_{progress}$ need not depend on the worst-case transaction confirmation time on blockchain 102. Pacemaker module 104 also responds to changeleader events originating from a report generation instance. This event indicates that the instance and its leader have run for the maximum permitted duration and that its epoch ends. When this occurs, pacemaker module 104 also aborts the current report generation instance and starts the next epoch, with a new report-generation instance and possibly a different leader.

The rounds are controlled by the leader node and by a timeout $\Delta_{round}$. This timeout, which is only triggered by the leader, controls the frequency of rounds and of gathering observations. The value of $\Delta_{round}$ must be lower than $\Delta_{progress}$ and larger than the network latency required to complete a full iteration of the report generation protocol during periods of synchrony, plus a safety margin.

Once a sufficient number of observations are collected together into the more compact form of a report, the report is ready for being sent to smart contract C by transmission module 108. The report contains enough signatures of the oracles for smart contract C to verify that the report is correct and valid. For preventing unnecessary reports, however, typically only the leader will generate such a report, and the oracles only participate in producing the report, under the following conditions: either their view of the data-stream value has changed by more than a fraction $\alpha$ compared to the most recent value reported by smart contract C or more than an interval $\Delta_C$ time has passed since that report.

The transmission protocol of transmission module 108 encapsulates the steps performed locally by each oracle for sending reports to smart contract C. Unlike the algorithms of pacemaker module 104 and report generation module 106, the protocol of transmission module 108 does not involve any communication among the oracles. Transmission module 108 delays reports pseudo-randomly to ensure a staged sending process, preventing a situation in which too many copies of the same report are sent simultaneously to smart contract C in fault-free cases. This saves cost because smart contract C may process all reports it receives, even when it does not include a report in the blockchain.

A semi-formal description of the oracle protocol, and its modules, can be created using an event-based notation, as used in the standard literature. See, for example, Christian Cachin, Rachid Guerraoui, and Luís E. T. Rodrigues. *Introduction to Reliable and Secure Distributed Programming* (2. ed.) Springer, 2011. ISBN: 978-3-642-15259-7. DOI: 10.1007/978-3-642-15260-3. A protocol is written in terms of a list of upon-handlers, which may respond to events or to conditions on the protocol's internal state. Handlers are executed atomically, i.e., in a serializable and mutually exclusive way, per protocol instance and per node such that no two handler executions of the same instance interleave. A protocol instance (i.e., an instance of Algorithm 1, Algorithms 2-4 or Algorithm 5 below) communicates with other instances running on the same oracle through events, which are triggered by invoke event (e.g. in the form of example-event(arg1, arg2)). For each triggered event, a handler of the form upon event example-event(arg1, arg2) do is executed once.

Events between two protocol instances executing on the same node can be handled in the same order in which they were triggered (i.e., FIFO order). The execution is otherwise asynchronous, which means that the invoking protocol may only obtain output from an invoked protocol instance via further events. Protocol instances communicate with peer instances running on different oracles by sending messages as send message [EXAMPLE-MESSAGE, arg1, arg2] to $p_j$. Messages also trigger events when they are received by the protocol on a destination node. Broadcasts can be used where an instance sends a message to all instances including itself:

send message [EXAMPLE-MESSAGE, arg1, arg2] to all $p_j \in P$

Every correct node continuously resends every message until the destination node acknowledges their receipt. However, a correct node does not further retransmit any message once its view of the current epoch (in Algorithm 1) or round (in Algorithms 2-4) has been incremented from the one to which a message pertains. Every receiving node acknowledges every message it receives, even if a message is a duplicate. Timers are created in a stopped state. After being started, a timer times out once and then stops. A timer can be (re)started arbitrarily many times. Restarting an already running timer is the same as stopping it and then starting it afresh. Stopping a timer is idempotent (i.e., denoting an element of a set which is unchanged in value when multiplied or otherwise operated on by itself).

The smart contract C can be managed by an owner with administrative powers. The owner can set future payment amounts and add or remove oracles. When the owner modifies the oracle set, an Ethereum log event is emitted by the contract informing the oracles about the new configuration of the off-chain network. The owner can be instantiated in various known ways. In practice, trust-minimization considerations would suggest using a contract that limits the power of malicious actors, for example, by requiring multiple signatures by independent parties or enforcing a waiting period before changes can be enacted.

Smart contract C records the reports, each of which contains a logical timestamp and multiple observation values. When C receives a transmission with report R with a more recent logical timestamp than the maximum smart contract C has seen, smart contract C updates its record with the median of all observation values in the report and exposes this to consuming contracts, such as consuming contract 110 on blockchain 102 of FIG. 1. For example, consuming contract 110 can be a contract executing a financial instrument, such as buying or selling of a derivative. In this example, the report could include price data for one or more underlying assets that define the derivative.

Transmissions with equal or smaller logical timestamp are ignored. Logical timestamps are implemented by epoch-round tuples (e, r), denoting the round r and the epoch and report-generation protocol instance e, in which the report was produced. Upon successful transmission of R, smart contract C can cause a payment to me made to each oracle that provided an observation to R and cause payment to the oracle that submitted R to compensate it for its transaction fee expenditure. Payment can be affected through blockchain 102 and can be made to cryptographic wallets associated with the oracle that is being paid.

As an example, an Ethereum implementation of C, written in Solidity, is set forth in the Code Appendix. In the example of the Ethereum contract, a transaction cost of ca. 291000 gas for 31 oracles was measured for the first transmission of a given epoch and round. Any subsequent transmission with the same epoch-round pair is ignored (technically, it aborts using Ethereum's revert) and costs ca. 42000 gas.

An example of a pacemaker protocol is provided in Algorithm 1 below. The algorithm is executed by pacemaker module 104 and governs the choice of a series of leaders associated with epochs numbered in succession 0, 1, 2, . . . . For each epoch, one instance of the report generation protocol in Algorithm 2-4 (also shown below and discussed in detail later) is created and executed. If this does not produce a valid report after $\Delta_{progress}$ units of time, the oracle initiates a switch to the next epoch, and the corresponding next leader. Algorithm 1 is similar to the leader-detection algorithm specified by Christian Cachin, Rachid Guerraoui, and Luís E. T. Rodrigues. *Introduction to Reliable and Secure Distributed Programming* (2. ed.) Springer, 2011. ISBN: 978-3-642-15259-7. DOI: 10.1007/978-3-642-15260-3. The algorithm disclosed herein is extended by means to tolerate lossy links, such that messages sent between correct oracles do not need to be buffered.

Every oracle $p_i$ maintains a local variable e, which denotes the epoch in which $p_i$ operates. Furthermore, as noted above, a variable l denotes the leader oracle $p_l$ of the current epoch, derived from e as l ← leader(e). The variable ne tracks the highest epoch number the oracle has sent in a NEWEPOCH message. These variables are maintained on persistent storage. The node broadcasts a NEWEPOCH message containing ne every $\Delta_{resend}$ seconds. This increases the probability that relevant NEWEPOCH messages get through, even if a message is dropped at some point. It also helps for integrating crashed oracles back into the protocol after they have recovered. Incorrect behavior by the current leader p' is determined by oracle $p_i$ if $p_i$ has not observed a valid final report by timeout $\Delta_{progress}$.

If an oracle receives more than f messages of the form [NEWEPOCH, e'], each one containing some e'>e, it infers that at least one correct node wishes to progress to some epoch higher than e. The node chooses this epoch e as the (f+1)-highest entry of newepoch and sends out its own [NEWEPOCH, ē] message. Since it is assumed that at most f nodes are Byzantine, receiving a message from more than f others implies that at least one correct node has earlier sent a [NEWEPOCH, ē] message. This protocol differs from the protocol in Cachin et al. at least in that ē is an arbitrary future epoch, not necessarily the next epoch from the receiving oracle's perspective. This allows the oracle to catch up if it misses messages pertaining to an entire epoch or more. Recall that correct nodes may also exhibit benign faults and be offline for some time. If f is close to n/3, this doesn't matter too much, since the protocol will not actually advance unless approximately ⅔ of the nodes positively respond with NEWEPOCH messages. For smaller f, though, arbitrary delays could lead to multiple distinct perspectives on the current epoch.

The node continuously records the highest epoch numbers received from all others through NEWEPOCH messages. If a node observes that more than 2f nodes wish to change to an epoch greater than e, the node aborts the currently running report generation protocol instance, and switches to epoch ē, where ē is the (2f+1) highest entry of newepoch. It also initializes the report generation protocol instance for. ē Because more than 2f nodes indicated epoch ē or greater, the node infers that more than f correct nodes wish to switch to a later epoch. This, in turn, implies that every correct node will receive more than f NEWEPOCH messages as well, since a correct node will send those messages to all other nodes. Hence, all correct nodes will eventually transmit a NEWEPOCH message containing epoch at least $\bar{e}$, according to the NEWEPOCH amplification rule, and initialize the report generation protocol for epoch $\bar{e}$.

At any time, some number c of nodes may exhibit benign faults and have crashed. If they eventually recover, they will resume operations (otherwise, they are considered as Byzantine). A crashed oracle will not rejoin Algorithm 2-4. In the following, assume that there are no simultaneous Byzantine faults and consider these scenarios:

c≤f: When no more than f oracles have crashed, the protocol maintains liveness and progresses normally (based on the assumption that there are no further Byzantine faults). When an oracle crashes in some epoch e, it misses all messages sent until it recovers. Upon recovery, it will eventually receive more than f NEWEPOCH messages containing an epoch larger than ne (recall that ne is restored from persistent storage upon recovery). This oracle will then rejoin the protocol by sending a NEWEPOCH message itself, denoting an epoch larger than ne.

c>f: During the time when more than f oracles have crashed, the protocol loses liveness. The protocol will resume operations successfully once n−f oracles are operating and more than f among them send a NEWEPOCH message with an epoch value of at least some e after recovery. This ensures that, eventually, more than f oracles send their own NEWEPOCH message with an epoch of at least and, in turn, all correct oracles announce epoch values e'≥e. This implies that the correct oracles eventually start epoch at least e.

Pacemaker module 104 is able to resume after a crash and subsequent recovery of any number of correct nodes. Note that the protocol ensures that for every correct oracle, the variable ne increases monotonically and, likewise, no entry in newepoch ever decreases. This follows directly from the protocol, e.g., for the assignments to ne that occur in the agreement rule, inside send-newepoch, from the way this function is called, and from the handling of received NEWEPOCH messages. Furthermore, note that ne≥e holds as well from the assignment to ne in the agreement rule and from the preceding reasoning. And since e is determined from the entries of newepoch that never decrease, also e increases monotonically.

Consider now a point in time when all correct nodes have recovered, there are Byzantine-faulty nodes, but the network timing has stabilized (i.e., a moment after GST). A stable situation also means that when a report generation protocol instance with a correct leader has been initialized by all correct oracles, this produces reports (and progress events) faster than $\Delta_{progress}$; hence, no correct oracle times out on $T_{progress}$ and initializes a further epoch like this.

Algorithm 1, which is discussed above, is set forth below.

```
state
  (e,l) ← (0,leader(0)): current epoch and leader for p_i
  ne ← e: highest epoch that p_i has initialized or for that it has sent a NEWEPOCH message newepoch
    ← [0]^n: highest epoch received from p_j in a NEWEPOCH message timer T_progress with timeout duration
    Δ_progress // leader must produce reports with this frequency, or be removed timer T_resend with timeout
    duration Δ_resend // controls resending of NEWEPOCH messages
  upon initialization do
    initialize instance (e,l) of report generation// see report generation protocol in Alg. 2-4 start timer
    T_progress
  upon event progress do// the current leader is progressing with the report generation protocol (see
    Algorithm 2)
    restart timer T_progress
  function send-newepoch(e^0) send message
    [NEWEPOCH, e^0] to all p_j ∈ P ne ← e^0
    restart timer T_resend
    upon event timeout from T_resend do// resend NEWEPOCH message every Δ_resend seconds, in case
    network drops it
    send-newepoch(ne)
  upon event timeout from T_progress or event                    // leader is too slow, or tenure is over
    changeleader do stop timer T_progress
    send-newepoch(max{e + 1,ne})
  upon receiving a message [NEWEPOCH, e^0] from p_j do
    newepoch[j] ← max(e^0,newepoch[j])
    upon |{p_j ∈ P |newepoch^{[j]} > ne}| > f do                 // NEWEPOCH amplification rule
    ē ← max{e' |{p^j ∈ P |newepoch^{[j]} ≥ e'}| > f }
    send-newepoch(max(ne,ē))
    upon |{p_j ∈ P |newepoch^{[j]} > e}| > 2f do                 // agreement rule
    ē ← max{e' |{p_j ∈ P |newepoch^{[j]} ≥ e'}| > 2f }
    abort instance (e, `) of report generation
    (e, `) ← e,¯ leader`ē))
      ne ← max {ne,e}                                             // see report generation protocol in Alg.
      initialize instance (e,`) of report generation                 2-4
      restart timer T_progress if i = l then
      invoke event startepoch(e,`)                                // see report generation leader protocol Alg.4
```

Correct oracles that have recovered may have missed arbitrarily many messages. Hence, their locally highest epochs (stored in ne) may vary widely. However, since all correct nodes resume the periodic transmission of NEWEPOCH messages, every correct node will soon receive n−f NEWEPOCH messages and determine an epoch number $\bar{e}$ in the NEWEPOCH amplification rule that is reported by more than f nodes. Notice that $\bar{e}$≥ne for the local variable ne of at least one correct node $p_j$. However, it may be that $\bar{e}$ is larger than the highest epoch for which any correct node has initialized the report generation protocol.

Let $p_s$ be some node with the (f+1)-largest value of the ne variables among the n−f correct nodes, and let $e_s$ denote this epoch number. According to the protocol, f+1 or more correct oracles will repeatedly send NEWEPOCH messages containing an epoch value of at least $e_s$. Since these messages are sent by correct oracles, every correct oracle will eventually have received at least f+1 such NEWEPOCH messages and send a NEWEPOCH message with parameter $e_s$ or higher as well. This implies that every correct oracle eventually stores n−f>2f entries in newepoch that are at least $e_s$. Hence, every correct oracle has either already initialized report generation protocol instance $e_s$ or will progress to epoch $e_s$ and initialize the report generation protocol instance $e_s$.

It can be shown that no correct oracle has yet aborted the report generation protocol instance $e_s$. by considering the monotonically increasing variables e and ne of each correct oracle. In order to progress to some epoch e'>$e_s$, a correct oracle would need more than 2f entries in newepoch containing e' or a higher value. Hence, accounting for f values reported by faulty oracles, more than f correct oracles would have sent NEWEPOCH messages containing e' or a larger value. However, the number of correct nodes whose ne variable may exceed $e_s$ and that might actually have sent NEWEPOCH messages with parameter larger than $e_s$ is at most f, according to the definition of $e_s$. This is a contradiction and shows that such an e does not exist.

The function leader: N→{1, . . . , n} maps epochs to leaders. This function can be balanced so that, for any long interval of epochs, every oracle becomes leader approximately the same number of times. The function should bet be deterministic and computable by every oracle. The standard implementation is to set leader(e)=(e mod n)+1. The ordering of the oracles is determined by the list in smart contract C. If this order may be influenced by the oracles (for example, when ordered by their identifying public keys), this may provide an opportunity for a coalition of faulty oracles to arrange themselves consecutively, which could lead to long delays between correct operations of the protocol.

However, a pseudo-random function for selecting a leader can be used to avoid this risk. This has the advantage that the leader sequence remains unpredictable to any observer outside the set of oracles, ensuring that an external adversary cannot predict and attack the leader of a particular future epoch. This can be implemented with a cryptographic pseudo-random function $F_x$: {0, 1}*→{0, 1}$^k$, where x is a secret key (called the "seed") and that maps an arbitrary-length input string to a fixed-length, k-bit output string that looks random to anyone who does not know the secret key.

Interpreting k-bit strings as integers, one may then set leader(e)=($F_x$(e)mod n)+1. The seed is specified by the operator at startup of the protocol; it must be the same for all oracles. The leader function may be adjusted so that no oracle is selected as leader in two consecutive epochs by changing the modulus to n−1 and renumbering the oracles to exclude the current leader.

Algorithms 2-4, below, govern the current leader oracle's coordination of the current round's oracle observations and signatures, assuming the leader is correct. All its messages are tagged implicitly by the epoch identifier (e, 1) and explicitly contain the round number (r). Notice this is one logical algorithm with two entirely separate parts, where Algorithms 2 and 3 contain code executed by all oracles including the leader p' and Algorithm 4 contains code executed only by $p_i$. This means the rules on atomic invocation of clauses hold across the whole report generation algorithm. All oracles start executing the protocol upon being initialized. The leader additionally receives a startepoch event, which actually triggers the message flow. The report generation protocol is only live when the leader is correct and may halt otherwise. The protocol executes a number of rounds and produces one report per round. After a predetermined number of rounds, it halts and signals to the pacemaker that it is time to kick off the next report generation protocol instance.

A new round is started every $\Delta_{round}$ units of time. The leader then sends first an OBSERVE-REQ message to all oracles. Oracles receiving an OBSERVE-REQ for round r from the leader move to round r, collect a new observation, sign it along with replay-prevention metadata, and send it back to the leader in an OBSERVE message. Once the leader has 2f+1 valid OBSERVE messages for round r, the leader waits out a grace period of duration $\Delta_{grace}$ so that delayed observations may also be included in the report. (Oracles are paid for their observations, and we don't want to withhold payment from oracles that are slightly delayed, e.g. because the API they're querying is slow. This also provides an incentive for oracles to participate in a speedy manner.) When the grace period expires, the leader collates the observations, sorts them by observation value, and sends them to all oracles in a REPORT-REQ message, as shown at 206 of FIG. 2*a*. The oracles check whether the report should be assembled (as explained in detail later), extract a compressed report containing just the observations and oracle identities, along with a validating signature, at 208 of FIG. 2*a*.

Once the leader has obtained more than f reports validated by signatures, it compresses them and produces an attested report for transmission to smart contract C. Taking more than f signatures ensures that the attested report has been validated by at least one correct oracle. Note that the attested report is not necessarily unique, even when the leader is correct, since any f+1 correctly signed observations form a valid attested report. Before the attested report is transmitted to smart contract C by executing Algorithm 5 below, the generation module 106 disseminates the report to all oracles.

Algorithm 2, which governs the report generation module follower protocol instance (e, 1) (executed by every oracle $p_i$) is set for the below.

```
state
  r_f ← 0: current round number within the epoch
  sentecho ← ⊥: echoed attested report which has been sent for this round
  sentreport ← FALSE: indicates if REPORT message has been sent for
  this round completedround ← FALSE: indicates if current round is
  finished
  receivedecho ← [FALSE]^n: jth element true iff received FINAL-ECHO message with valid attested
  report from p_j
  upon receiving message [OBSERVE-REQ,r^0] from p s.t. r_f < r^0 ≤ r_max + 1 do
    r_f ← r^0 // oracle moves to next round as follower if r_f > r_max then // p has exhausted its maximal
    number of rounds invoke event changeleader // see report pacemaker protocol in Alg. 1 exit
      // oracle halts this report generation instance sentecho ← ⊥;sentreport ←
    FALSE;completedround ← FALSE receivedecho ← [FALSE]^n
```

-continued

```
v ← current observation of the value oracle reports on (e.g. price)
σ ← sign_i([OBSERVE,e,r,v]) send
message [OBSERVE,r,v,σ] to p
upon receiving message [REPORT-REQ,r⁰,R] from p s.t. r⁰ = r_f ∧ ¬sentreport ∧ ¬completedround do if
verify that R is sorted with entries from 2f + 1 distinct oracles
   ∧ verify that all signatures in R are valid then if
should-report(R) then
R⁰ ← a
        τ ← sign_i([REPORT,e,r_f,R⁰])           // validate the report
        sentreport ← TRUE
                                                 // the round continues
        send message [REPORT,r_f,R⁰,τ] to p
compressed list of the form [(w,k)...] from R = [(w,k,σ)...]
        else complete-round( )
upon receiving message [FINAL,r⁰,O] from p s.t. r⁰ = r_f ∧ sentecho = ⊥
do if verify-attested-report(O) then sentecho ← O
send message [FINAL-ECHO,r,O] to all p_j ∈ P
upon receiving a message [FINAL-ECHO,r⁰,O] from p_j s.t. r⁰ = r_f ∧ ¬receivedecho[j] ∧
¬completedround do if verify-attested-report(O) then receivedecho[j] ← TRUE if sentecho = ⊥
then sentecho ← O
send message [FINAL-ECHO,r,O] to all p_j ∈ P
upon |{p_j ∈ P|receivedecho[j] = TRUE}| > f ∧ ¬completedround do invoke transmit(sentecho) //
see transmission protocol in Alg. 5 complete-round( )
```

Algorithm 3, which governs report generation module 106 follower protocol, helper functions, instance (e, 1) (executed by every $p_i$) is set forth below.

function should-report(R)
   //$C_O = (C_e, C_r, C_R, C_J, C_S)$ is the most recent report committed by C, as known to $p_i$
   //let $t_C$ denote the time when C committed $C_O$
   v ← median($C_R$)  v⁰ ← median(R)
   return $(C_e, C_r) = (0,0) \lor (\text{now} - t_C > \Delta_C) \lor (|v-v'|/|v| > \alpha)$
   //now denotes the current local time at $p_i$ function complete-round( ) //terminates the round in two cases ... completedround←TRUE//(1) when no transmit is needed and (2) when transmit has been invoked invoke event progress
//see pacemaker protocol in Alg. 1; indicates leader is performing correctly//the round ends and $p_i$ waits until p' initiates the next round function verify-attested-report(O) //verify that more than f signatures attest report O
(
•, •, R, J, T) ← O
k=1 ... f+1 for do
   if ¬verify$_{J[k]}$([REPORT, e, $r_f$, R], T[k]) then return FALSE return TRUE Algorithm 4, which governs report generation module protocol instance (e, ') (executed by p'.)

```
state
    r ← 0: current round number within the epoch
    observe ← [⊥]ⁿ: signed observations received in OBSERVE
    messages report ← [⊥]ⁿ: attested reports received in REPORT
    messages timer T_round with timeout duration Δ_round, initially stopped
    timer T_grace with timeout duration Δ_grace, initially stopped
    phase ← ⊥: denotes phase within round in {OBSERVE, GRACE, REPORT, FINAL}
    upon event startepoch(e,`) do start-round( )
    upon timeout from T_round do
        start-round( )
    function start-round( )
    r ← r + 1 // leader protocol moves to next round observe ← [⊥]ⁿ;report ← [⊥]ⁿ send
    message [OBSERVE-REQ,r] to all p_j ∈ P start timer T_round
    phase ← OBSERVE
    upon receiving message [OBSERVE,r⁰,w,σ] from p_i s.t. r⁰ = r ∧ i = ` ∧ observe[j] = ⊥ ∧ phase
    ∈ {OBSERVE, GRACE} do if verify_j([OBSERVE,e,r,w],σ) then observe[j] ← (w,σ)
    upon |{p_j ∈ P|observe[j] =6⊥}| = 2f + 1 ∧ phase = OBSERVE do
    start timer T_grace    // grace period for slow oracles
    phase ← GRACE
    upon event timeout from T_grace ∧ phase = GRACE do assemble report R
    ← sorted((w,k,σ) for k,(w,σ) inenumerate(observe)) send message
    [REPORT-REQ,r,R] to all p_j ∈ P phase ← REPORT
    upon receiving message [REPORT,r⁰,R,τ] from p_i,s.t. r⁰ = r ∧ i = ` ∧ report[j] = ⊥ ∧ phase =
    REPORT do if verify_j([REPORT,e,r,R],τ) then report[j] ← (R,τ)
    upon exists R s.t. |{p_j ∈ P|report[j] = (R,·)}| > f ∧ phase = REPORT
    do k ← 1
    for j ∈ {1,...,n} s.t. report[j] = (R,τ) do // collect the attestation of the final report J[k] ← j; T[k]
    ← τ
    k ← k + 1
    O ← [e,r, R,J,T]
    send message [FINAL, r, O] to all p_j ∈ P phase
    ← FINAL
```

Figure 2B:
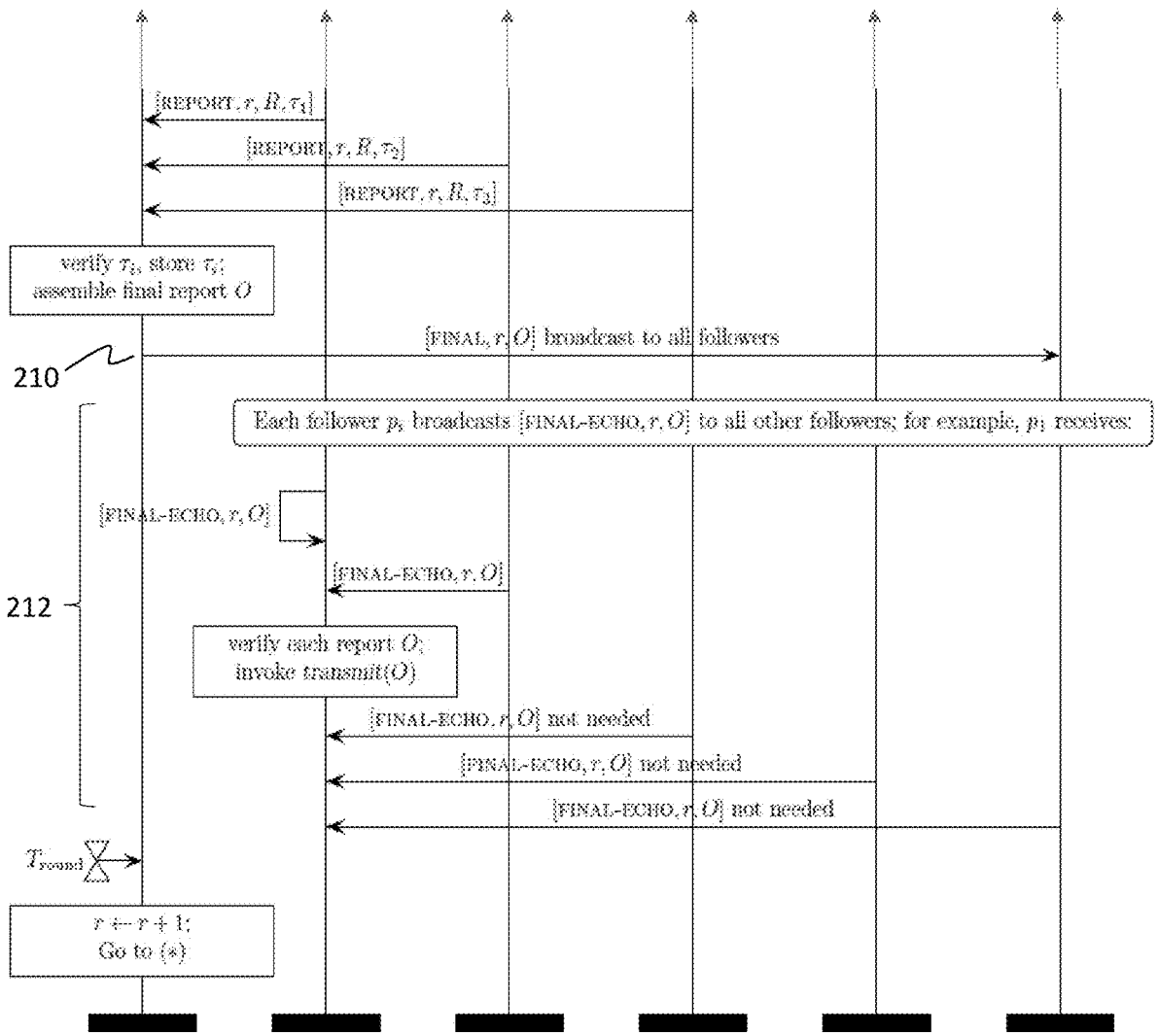

To start the dissemination of a report, $p_l$ sends a FINAL message containing the attested report to all oracle nodes, as shown at 210 of FIG. 2b. Once a node receives such a message with a properly attested report, it sends the report again to all nodes in a FINAL-ECHO message, as shown at 212 in FIG. 2b. Alternatively, when a node receives first a FINAL-ECHO message with a properly attested report and has not yet echoed one, then the node sends a FINAL-ECHO message with this report as well. When a node has obtained more than f valid attested reports, it invokes the transmission protocol of transmission module 108 through a transmit event and passes one of the attested reports to Algorithm 5. As noted above, attested reports are not necessarily unique, as an incorrect leader could send different nodes attestations from different size-f subsets of the follower attestations it receives, or an incorrect follower could re-order the attestations it receives from the leader. Note that the amplification of FINAL-ECHO messages ensures that the transmission protocol is either started by all correct oracles or by none, but not necessarily with the same attested report. When timer $T_{round}$ expires, as described in more detail below, a new round is started.

The round may fail due to network delays or when the leader node does not behave correctly. For instance, the leader may not gather enough signatures on the report in time or may fail to send some messages. The report generation protocol instance may then never produce an attested report or cause that only some of the oracles invoke the transmission protocol. Such liveness violations are caught by the calling pacemaker protocol, however, because no progress events are emitted.

The oracle protocol prevents a situation in which a leader runs for more than $r_{max}$ rounds, where $r_{max}$ is a global parameter. This is to prevent a malicious leader from driving the protocol as quickly as possible and causing a denial-of-service attack, for example, through oracles exhausting their computational or network capacity, or by making oracles hit API limits. In particular, when the leader attempts to start any round numbered higher than $r_{max}$, then every oracle exits the report generation protocol after receiving a corresponding OBSERVE-REQ message as a follower. The oracle signals this to the pacemaker protocol with a changeleader event and halts any further processing in this instance.

The function should-report determines whether the oracle should validate the current report and has a dual purpose. First, it prevents coalitions of up to f malicious oracles from spamming smart contract C with transmissions in order to quickly extract reward payouts for useless reports. Second, it enables running rounds in quick succession without spending lots of gas on spurious updates that don't materially change the median exposed by smart contract C. Function should-report assesses if the oracle should participate in producing the report. As mentioned before, this is the case when the value to be reported has changed significantly with respect to value $C_R$ committed by C most recently, enough time has passed since then, or when the report generator has just been initialized for the first time ever and the committed epoch-round tuple is still the initial value $(C_e, C_r)=(0, 0)$.

Since the function refers to the current time, it implicitly assumes clock synchronization. However, the duration $\Delta_C$ is a different order of magnitude than expected clock skew, so any split view on whether a report should be transmitted should resolve within an epoch or two. Note that asynchronous periods may also result in a split view among the correct oracles on whether the leader makes enough progress in the pacemaker protocol (Algorithm 1), i.e., when f+1 oracles have faster clocks than the rest of the group including the leader.

Algorithm 5 below can be executed by transmission module 108 to govern transmitting a final report O (produced by Algorithms 2-4) to the smart contract C on blockchain 102 of FIG. 1. The function of Algorithm 5 creates a suitable transaction, such as an Ethereum transaction when using an Ethereum blockchain, containing final report O. Under ideal conditions, transmission module 108 starts the transmission protocol at roughly the same time across all oracles. To avoid redundant transmissions and reduce gas costs, the algorithm first filters incoming reports. This provides protection against a scenario where many rounds complete in quick succession and produce a large number of similar reports. In such a case, only the first such report should be transmitted, and the following reports should be discarded. To do so, the protocol keeps track of the latest incoming report L and only allow a report O through the filter if (1) C has seen a report at least as recent as L, i.e., there is no backlog of reports, or (2) if O's median observation value deviates sufficiently from the median in L.

Algorithm 5 transmission protocol (oracle $p_i$).
 state timer Transmit, initially stopped: delays until next report should be transmitted reports←heap-new( ): priority queue of time-report pairs (t, O), keyed on ascending time values
 L=(Le, Lr, LR, LJ, LS)+1: latest report accepted for transmission
 CO=(Ce, Cr, CR, CJ, CS): most recent report committed by C, as known to pi
 upon event transmit(O) do
  (O, O, O O
  if then //O is outdated compared to CO
 return
 if L=6⊥∧(Oe, Or)≤(Le, Lr) then
 return //O is outdated compared to L
 if L=⊥∨|median then
 L←0
 Δtransmit←transmit-delay(i, Oe, Or) insert (now+ Δtransmit, O) into reports (t, O)=heap-peek(reports) //recall reports contains (t, O) pairs sorted by ascending t
 restart Ttransmit with delay (t−now)
 upon event timeout from Ttransmit do if |reports|=0 then
  return
 (reports)
 (
 if then
 send Ethereum transaction with O to C
 if |reports|>0 then
 (t, •)←heap-peek(reports) restart Ttransmit with delay (t−now)
 function transmit-delay(i, e, r)
 π←Gx(ekr)//derive pseudo-random permutation over {1, . . . , n} k←k such that //assuming s0=0 return k·Δstage After a report passes the filter of Algorithm 5, the algorithm proceeds in stages and is globally parameterized by a stage duration $\Delta_{stage}$ and a schedule $S=(s_1, \ldots, s_{|S|})$. In stage i, there are $s_i$ distinct and randomly selected oracles that attempt to transmit the report to C. Each oracle is chosen at most once as a transmitter. Furthermore an oracle will transmit O only if the oracle has not yet observed the report on the blockchain, as committed by smart contract C. Stage i starts after duration $(i-1)\Delta_{stage}$ has elapsed. Writing $t_0=0$ and $t_k=\Sigma_{j=1}^{k} s_j$, this means that, in stage k, the oracles on position $t_{k-1}+1, \ldots, t_{k-1}+s_k$ of π are supposed to transmit.

By requiring that $\Sigma_i\, s_i > f$, we can ensure that there is at least one correct node that will transmit to smart contract C. The timeouts are such that reports to be transmitted from multiple rounds may overlap substantially, i.e., a report from the subsequent round may arrive before many oracles had a chance to transmit. A realistic setting is $n \cdot \Delta_{stage} \gg \Delta_{round}$. This is described in greater detail below.

For the transmission protocol effected by transmission module 108 to achieve its goal, a correct oracle must always be able to get a transaction included in the blockchain within $\Delta_{stage}$ time. This assumes that (1) miners are actively mining the blockchain and including transactions from their mempools according to the dynamics and that (2) the oracle appropriately sets (or escalates) its price bid to have the transmission transaction included in the blockchain. These assumptions may be violated in practice, e.g., during times of particularly egregious congestions of the Ethereum blockchain. In such cases, transmission transactions will still be included eventually, but later and possibly at a higher total gas cost.

The selection of transmitting oracles occurs with a pseudo-random function $G_x$: $\{0, 1\}^* \rightarrow \text{Sym}(n)$, where x is a secret key known only to oracles and Sym(n) is the set of permutations of $\{1, \ldots, n\}$. Given (at least implicitly) the protocol identifier, epoch, and round, $G_x$ deterministically derives a permutation of the node set. As with the leader function described herein, the secret x should not be known to the oracles before they are committed to their indexing $\{p_1, \ldots, p_n\}$, so that a malicious coalition cannot arrange themselves to dominate the early parts of the schedule. Faulty oracles may misbehave and ignore the global transmission schedule given by the algorithm, e.g., because their clock is malfunctioning or because they wish to earn the higher payment afforded to the first transmitting oracle. (Oracles that observe, but do not transmit, are paid less.) A defense against this behavior can be based on economic incentives. The owner should monitor smart contract C and check that oracles follow the transmission schedule. The owner of smart contract C is expected to remove any oracles that consistently misbehave (i.e., submit too late or too early) from the protocol, preventing them from earning future reporting and transmission fees. Since such an attack threatens neither key safety nor liveness properties, and the ratio between earnings from ongoing protocol participation to earnings from such an attack (prior to discovery) is expected to be high.

Note that all modules and protocols in the disclosed implementations are functional under partial synchrony only to the extent that the timing characteristics of the network after GST are reflected by the chosen constants. Since they are fixed and not determined adaptively with respect to an unknown $\Delta$, the protocol does not formally adhere to partial synchrony. Below is an example of how many of the constants used in the protocol can be set.

$\Delta$ is the upper bound on communication latency during periods of synchrony. The choice of all other time constants is constrained by this. Estimate: 1 second $\Delta_{progress}$ is the duration in which a leader must achieve progress or be replaced. Estimate: 45 seconds $\Delta_{resend}$ is the interval at which nodes resend NEWEPOCH messages. Estimate: 30 seconds $\Delta_{round}$ is the duration after which a new round is started. Estimate: 30 seconds $\Delta_{grace}$ is the duration of the grace period during which delayed oracles can still submit observations. Estimate: 2 seconds $\Delta_C$ limits how often updates are transmitted to the contract as long as the median isn't changing by more then $\alpha$. Estimate: 5 minutes-24 hours $\alpha$ allows larger changes of the median to be reported immediately, bypassing $\Delta_C$. Estimate: 0.2%-5% (depending on price feed that is being watched)

$\Delta_{stage}$ is used to stagger stages of the transmission protocol. Multiple Ethereum blocks must be mineable in this period. Estimate: 60 seconds-90 seconds $r_{max}$ is the maximum number of rounds in an epoch. Estimate: 3-10 n is the number of oracles. In our initial implementation, we assume $n \leq 31$.

All hash and signature computations can use proper domain separators, which are omitted from the above protocol description for notational clarity. Domain separators include:

Protocol identifier

Address of smart contract C

A counter of protocol instances (maintained by smart contract C)

Chain identifier (e.g. for Ethereum mainnet)

Set of oracles P

In the protocol of some disclosed implementations, $\Delta_{round}$ controls the frequency at which a correct leader should create reports. However, it might be desirable to produce more frequent reports upon observing significant changes of the reported data stream. Some form of aggregate or threshold signature scheme could be used instead of the vector of ECDSA signatures used in the examples above. The constant (in n) gas costs of signature verification enables support of much larger oracle sets. A new oracle list signed by a quorum of oracles from the current set could be used to change the off-chain oracle set without requiring the owner of contract C to intervene.

The protocol of pacemaker module 104 discussed above is now discussed in more detail. The pacemaker protocol can run continuously. It interacts with its environment by consuming (input) events of type progress and changeleader, by initializing and aborting report generation protocol instances, each identified by a unique (e, l) pair, and by emitting startepoch(e, l) (output) events at the leader.

initialize a report generation instance (e, l): This indicates that the oracle moves to epoch e and runs the corresponding report generation instance with oracle/as leader. At most one report generation protocol instance is initialized for a particular (e, l).

abort a report generation instance (e, l): Stops the running protocol instance identified by epoch e and leader l.

startepoch(e, l): Indicates at oracle p' that the oracle should start epoch e as leader. This occurs only after the report generation instance (e, l) has been initialized by p'.

progress: Originates from the current report generation protocol instance and indicates that the leader has made adequate progress, according to the oracle's local view and clock.

changeleader: Originates also from the current report generation protocol instance and indicates that this instance has reached its maximal number of rounds; therefore, the oracle should advance to the next epoch with a new leader.

Furthermore, the protocol of pacemaker module 104 internally uses a timer $T_{progress}$ with duration $\Delta_{progress}$ that captures the assumption that every report generation protocol instance should repeatedly emit progress or changeleader events that are no more than $\Delta_{progress}$ apart. Since the report generation protocol is driven by a leader oracle p', we say that the oracle "times out on p'" when no progress or changeleader event occurs between two successive timeouts from $T_{progress}$. A pacemaker protocol has the following properties:

Eventual succession: If more than f correct oracles have initialized some epoch e with leader p' during a period of network synchrony after GST and subsequently either time out on p' or receive a changeleader event, then all correct oracles will advance to epoch e+1 after at most $2\Delta_{resend}+2\Delta+4\epsilon$.

Putsch resistance: A correct oracle does not abort the current epoch and initialize a new epoch unless at least one correct oracle has timed out on the leader of the current epoch or the report generation protocol has indicated to change the leader.

Eventual agreement: Eventually, every correct oracle has initialized the same epoch e with leader p' and does not abort it unless some correct oracle times out or indicates a leader change.

Algorithm 1, and how it implements the pacemaker module protocol, is now discussed in more detail. First, a number of lemmas (i.e., intermediate theorems) are formulated. Lemma 1 characterizes how the correct oracles progress to subsequent epochs. Notice this holds also for asynchronous periods. Assume that the maximal epoch that has been initialized by any correct oracle is $\bar{e}$ and let ne denote the maximal value of variable ne at any correct oracle. Then, if no correct oracle times out and epoch $\bar{e}$ does not indicate a leader change at any correct oracle, then no correct oracle broadcasts [NEWEPOCH, e'] with e'>ne; $\bar{e} \leq ne \leq \bar{e}+1$.

Recall the role of variable ne in Algorithm 1, which records the highest epoch for which the oracle has ever broadcast a NEWEPOCH message, and that ne is at least the current epoch value e for correct oracles. To prove claim (a), note that an oracle with current epoch $\bar{e}$ can only advance $\overline{ne}$ to e+1 independently, i.e., without receiving any NEWEPOCH messages, through the "leader is too slow, or "tenure is over" handler. However, this is ruled out by the assumption of the lemma. Therefore, the only way for a correct node to increase ne beyond $\overline{ne}$ is via the "NEWEPOCH amplification rule." This triggers when the oracle receives [NEWEPOCH, e'] messages with e'>ne from more than f oracles.

We now establish an infinite descent to obtain a contradiction. Suppose that a correct oracle has current epoch to $\bar{e}$ and its "NEWEPOCH amplification rule' is triggered, so that ne becomes greater than $\overline{ne}$. Since there are at most f faulty oracles, but more than f [NEWEPOCH, e'] messages with e'>ne have been received, at least one other correct oracle has sent [NEWEPOCH, e']. Hence, this oracle's ne variable is also greater than ne. This leads us back to the supposition at the start of this paragraph, with a different correct oracle. We continue this argument by induction and observe that ne>$\overline{ne}$ implies there are infinitely many distinct, correct oracles. However, the set of oracles is finite and ne$\leq \overline{ne}$ for all of them. Therefore, all correct oracles will correspondingly broadcast [NEWEPOCH, e'] with e'$\leq$ne.

To establish claim (b), suppose towards a contradiction that $\overline{ne} \geq e+2$. It follows from the above argument that at least one correct oracle has sent a NEWEPOCH message containing epoch $\bar{e}=e+2$ or higher, through the "NEWEPOCH amplification rule." However, this oracle has set ne to e+1 from its variable e according to the algorithm. But $\bar{e}$ is the maximum epoch value e of any correct oracle and therefore $e+1=ne=\overline{ne} \geq e+2 \geq e+2$, a contradiction. It follows that $\overline{ne}$ is at most e+1.

The partially synchronous system model postulates a global stabilization time (GST), after which no more crashes occur, clocks are synchronized, and every message between two correct oracles is delivered within $\Delta$. Suppose that the local processing time of any correct oracle after receiving messages is at most $\epsilon$; this includes receiving multiple messages concurrently, i.e., is an upper bound on the processing latency of all messages and local events between receiving and sending messages over the network. This value is negligible compared to the other durations under consideration. The next lemma establishes a condition for reaching agreement after GST, in the sense that all correct oracles initialize the same epoch and remain in this epoch long enough.

For Lemma 2, consider an epoch e such that no correct oracle has initialized any higher epoch than e. If some correct oracle has initialized e before GST, then define a point in time $\tau$ to be GST; otherwise, let $\tau$ be the time when the first correct oracle initializes e. Let ne denote the maximal value of variable ne at any correct oracle at time $\tau$. If e=ne, no correct oracle times out, and epoch e does not indicate a leader change at any correct oracle during at least $\Delta_{agree}=2\Delta_{resend}+2\Delta+4\epsilon$ after $\tau$, then all correct oracles have initialized epoch e at time $\tau+\Delta_{agree}$ and do not abort it afterwards unless epoch e indicates a leader change.

Notice that the local epochs and the highest epochs (stored in e and ne, respectively) of the correct oracles may differ because of crashes. In particular, correct oracles that have recovered may have missed arbitrarily many messages. Let $p_i$ be the oracle that has initialized epoch e according to the assumption. It has received more than 2f NEWEPOCH messages containing an epoch value of at least e. More than f of those messages were sent by correct oracles. Even if these nodes had crashed, they meanwhile recovered, restored their e and ne variables to their highest values before the crash, and operate correctly from now on. Thus, more than f correct nodes retransmit NEWEPOCH messages with an epoch value of at least e at most $\Delta_{resend}+$after $\tau$. Thus, after at most $\Delta_{resend}+\Delta+2\epsilon$, every correct oracle has received and processed more than f NEWEPOCH messages containing an epoch value of at least e. According to the algorithm and the "NEWEPOCH amplification rule," since epoch values of at least e are reported more than f times, every correct oracle broadcasts a NEWEPOCH message containing epoch e or higher after no more than $2\Delta_{resend}+\Delta+3\epsilon$.

These messages are received by all correct oracles after at most $2\Delta_{resend}+2\Delta+4\epsilon=\Delta_{agree}$. Therefore, every correct oracle has received n-f>2f NEWEPOCH messages with epoch at least e and has initialized epoch e after $\Delta_{agree}$. Lemma 1(a) implies that no oracle initializes a higher epoch afterwards, until epoch e indicates a leader change. Notice that the previous lemma only bounds the time after GST for reaching agreement on a particular epoch e when e=$\overline{ne}$. If some correct nodes have initialized epoch e at GST and $\overline{ne}=e+1$, which is the only alternative to this condition according to Lemma 1, it means that that variable ne of at least one correct oracle is equal to ne. The situation may remain like this for an unbounded period. But once the faulty oracles cause a correct oracle to initialize epoch ne by sending NEWEPOCH messages with parameters at least ne, the condition of the lemma applies again and bounds the time that the correct oracles need for progressing to epoch ne. We can summarize this behavior less precisely in the following lemma. For the third Lemma, we assume there exists a point in time after GST, after which every correct oracle has initialized the same epoch e and does not abort it unless some correct oracle times out or an indicates a leader change for epoch e.

For Lemma 4, consider a period of network synchrony after GST. If more than f correct oracles are in epoch e with leader $p_l$ and either time out on $p_l$ or receive a changeleader event, then all correct oracles will advance to epoch e+1 after at most $2\Delta_{resend}+2\Delta+4\epsilon$. Notice that when a correct oracle times out on p' or receives a changeleader event during epoch e, it sets ne=e+1. Thus, the proof of Lemma 2 applies for this situation as well because more than f correct oracles send NEWEPOCH messages with e+1. Hence, all correct oracles have initialized epoch e+1 after at most $2\Delta_{resend}=2\Delta+4\epsilon$.

As Lemma 5, assume a correct oracle does not abort an epoch e unless at least one correct oracle has timed out on the leader of epoch e or the report generation protocol has indicated to change the leader. Notice that ne in Lemma 1 is the maximal epoch value that any correct oracle has ever sent in a NEWEPOCH message. Assume that e is the highest epoch initialized by any correct oracle, hence we have ne=e. Towards a contradiction, suppose that some correct oracle has aborted epoch e. According to the algorithm, this means it has received NEWEPOCH messages for some epoch higher than e from more than 2f oracles, of which some were sent by correct oracles. But by Lemma 1(a) with ne=e, no correct oracle has sent a NEWEPOCH message with an epoch higher than e under the assumptions of putsch resistance. The lemma follows. The statements of Lemmas 3-5 imply all properties of a pacemaker protocol. Therefore, the following result summarizes our analysis.

As noted above, the protocol of report generation module 106 is parameterized by an epoch number e and a leader oracle $p_l$. The protocol receives a startepoch(e, l) event (only at the leader; the parameters e and l are redundant). It generates one or more transmit(O) events at all oracles, where O denotes an attested report to be transmitted; we say that the oracle starts transmission at this point and the report is taken up by the transmission protocol. Moreover, the report generation protocol at every oracle periodically emits a progress event and thereby signals that it makes progress to pacemaker module 104. The report generation protocol may also produce at most one changeleader event, indicating that the report generation protocol has ended; this occurs after transmitting $r_{max}$ attested reports. Messages of the protocol include those set forth below.

startepoch(e, l): Instructs the oracle $p_l$ to start epoch e as leader.

progress: Indicates that the report generation protocol instance has made progress, in the sense that the leader $p_l$ has collected one round of observations from the oracles.

changeleader: Indicates that the report generation protocol terminates because it has performed the maximum foreseen number of observation collections and possible transmissions.

transmit(O): The report generation protocol has generated an attested report O and starts transmission with O.

Furthermore, every oracle running the protocol has access to a constantly changing observation value v; we assume this is read into variable v immediately before the code accesses this value. We say that an oracle "observes" value v when this occurs. An oracle $p_i$ may consult the most recent attested report $C_O$, which contains the oracle report $C_R$ committed most recently by C. Notice that due to dissemination delays, not every oracle receives updates to $C_O$ at the same time. In the following, we refer to this $C_R$ as the "committed" report that $p_i$ knows.

Internally, the leader of the report generation protocol uses two timers, $T_{round}$ and $T_{grace}$. They are used to refine the above properties during synchronous periods. Time $T_{round}$ runs continuously with duration $\Delta_{round}$ and controls the periodic start of a new report generation round. Timer $T_{grace}$ is active during the grace period for $\Delta_{grace}$ and controls the extra waiting time for receiving observations into the current report from late oracles. When an oracle $p_i$ receives a report R containing observations from 2f+1 oracles, the oracle checks if R should be reported with respect to the committed report $C_R$ and the current time, as specified by function should-report(R) in Algorithm 2. In the following, let $4^+=\Delta_{grace}+6\Delta+8\epsilon$.

A report generation protocol satisfies these conditions:

Transmission totality: If at some point in time after GST a correct oracle starts transmission with an attested report O=(e, r, R . . . ) and the report generation protocol instance is not aborted, then every correct oracle starts transmission with an attested report O'=(e', r', R', . . . ) such that (e, r)=(e, r) within at most $2\Delta+2\epsilon$.

Observation integrity: If a correct oracle starts transmission of an attested report with median v, then v is either the observation of a correct oracle or lies between the observations of two correct oracles.

Responsiveness: Consider a point in time after GST when the network has synchronized and every correct oracle knows some committed report $C_R$ and suppose $p_l$ is correct. If every correct oracle observes a value that should be reported and the epoch is not aborted, then every correct oracle starts transmission within at most $\Delta_{round}+\Delta^+$.

Progress: Suppose p' is correct and that the report generation protocol is not aborted. Consider the point in time after GST, when all correct oracles have initialized the report generation protocol. Then, every correct oracle indicates that it makes progress or started a transmission once in the interval $[\rho(\Delta_{round}+\epsilon), \rho(\Delta_{round}+\epsilon)+\Delta^+]$ for $\rho=1 \ldots r_{max}-1$. Furthermore, every correct oracle indicates to change the leader once in the interval $[r_{max}(\Delta_{round}+\epsilon), r_{max}(\Delta_{round}+\epsilon)+\Delta^+]$.

Timely inclusion: Consider a point in time after GST when the network has synchronized and suppose some correct oracle $p_i$ observes a value v that should be reported. If the leader is correct and $\Delta+2\epsilon\leq\Delta_{grace}$, then the attested report in the next transmission started by $p_i$ contains v reported by $p_i$.

Bounded leader tenure: No correct oracle starts transmission in this report generation protocol more than $r_{max}$ times.

Now, a proof that Algorithm 2-4 implements a report generation protocol is developed. For the $7^{th}$ Lemma, consider a point in time after GST and suppose a correct oracle starts transmission in a round r. Then every correct oracle starts transmission in round r within at most $2\Delta+2\epsilon$ or the report generation protocol instance is aborted. As a proof, suppose the correct oracle $p_i$ has started transmission in round r and that the report generation instance is not aborted. Then it has received properly attested reports, as determined by verify-attested-report, from more than f distinct other oracles. Since the verification function does not depend on local state, every other correct oracle also recognizes such an attested report as properly attested. Notice at least one of the oracles that sent a properly attested report to $p_i$ is correct, hence, it has sent a FINAL-ECHO message containing this attested report O to all nodes. At most $\Delta+\epsilon$ later, every correct node therefore has received O or has already received some properly attested report earlier. This means that every correct node sends a FINAL-ECHO with O in response or has sent some attested report in such a message earlier. Thus, at the latest after $2\Delta+2\epsilon$, every correct oracle has received $n-f > f$ FINAL-ECHO messages with possibly different, but always valid, attested reports and has started to transmit a report.

As the eights Lemma, assume the median observation value in an attested report as determined by verifyattestedreport is either the observation of a correct oracle or lies between the observations of two correct oracles. Recall that an attested report R contains a (compressed) list of 2f+1 observations. Since R has been attested, there is at least one correct oracle $p_j$ that has validated and signed R. During the report validation earlier, $p_j$ has verified that every observation in R has been signed by a distinct oracle. Since the report contains 2f+1 observations, strictly more than half of the values in R represent observations by correct oracles. Hence, the median value of an attested report is either an observation of a correct oracle or it is from a faulty oracle, but R contains a smaller and a larger observation, both from correct oracles.

As Lemma 9, consider a point in time after GST when the oracle network has synchronized and every correct oracle knows some committed report $C_R$ and suppose p' is correct. If every correct oracle observes a value that should be reported and the epoch is not aborted, then every correct oracle starts transmission within at most $\Delta_{round}+\Delta_{grace}+6\Delta+8\epsilon$. Notice that under the conditions of the lemma, a fresh round is started by the correct leader at most after $\Delta_{round}$. Every correct oracle sends its observation to $p_l$, and $p_l$ combines these to a report R. According to Lemma 8, the median observation value in R is the observation of a correct oracle or lies between the observations of two correct oracles. Hence, testing if the median value of R should be reported ensures that when all correct oracles observe values to be reported, then the test succeeds. For the rest of the argument, follow the algorithm as driven by the correct leader. Then the additional maximal delays after $\Delta_{round}$ until a correct oracle transmits the report are as follows:

1) $\epsilon+\Delta$ for p $\ell$ to start the round and send the OBSERVE-REQ message until every correct oracle receives it;
2) $\epsilon+\Delta$ for every correct oracle to respond with a OBSERVE message to $p_l$.
3) $\epsilon+\Delta_{grace}$ for the leader to process all OBSERVE-REQ messages and to wait during the grace period;
4) $\epsilon+\Delta$ for p $\ell$ to finish the grace period and to send a REPORT-REQ message to all oracles until every correct oracle receives this;
5) $\epsilon+\Delta$ for every correct oracle to respond with a REPORT message to $p_l$;
6) $\epsilon+\Delta$ for p $\ell$ to produce a FINAL message and until every correct oracle receives it;
7) $\epsilon+\Delta$ for every correct oracle respond to the FINAL message with a FINAL-ECHO message and until every correct oracle receives f+1 of these; and
8) for every correct node to process the FINAL-ECHO messages and start transmission.

The precondition of the previous lemma can be generalized in the sense that not all correct oracles may locally know the same report $C_R$. In particular, each one might know a potentially different committed report from C, but still such that the report value R in REPORT-REQ should be reported compared to the committed report. Then the conclusion of the lemma follows as well. Last, but not least, recall from the implementation of should-report(R) that to check whether R should be reported, the time that has elapsed since the latest known committed report was produced and moment of checking counts as well.

As Lemma 10, suppose p' is correct and that the report generation protocol is not aborted. Consider the point in time after GST, when all correct oracles have started the report generation protocol, and let $\Delta^+=\Delta_{grace}+6\Delta+8\epsilon$. Then, every correct oracle has indicated that it makes progress or started a transmission once in the interval $[\rho(\Delta_{round}+\epsilon), \rho(\Delta_{round}+\epsilon)+\Delta^+]$ for $\rho=1\ldots r_{max}-1$. Furthermore, every correct oracle indicates to change the leader once in the interval $[r_{max}(\Delta_{round}+\epsilon), r_{max}(\Delta_{round}+\epsilon)+\Delta^+]$. The proof of Lemma 9 above shows that the duration of a round at each correct oracle is at most $\Delta^+=\Delta_{grace}+6\Delta+8\epsilon$, measured from the time when the leader starts it. Since clocks are synchronized and messages are not delayed by more than $\Delta$ after GST, $p_l$ starts round number $\rho$ with a delay of $\rho(\Delta_{round}+\epsilon)$ after starting the report generation protocol. According to the protocol and using similar reasoning as in the proof above, every correct oracle then indicates either progress or a leader change at most $\Delta^+$ after the leader starts the round.

As Lemma 11, consider a point in time when the network has synchronized and suppose some correct oracle $p_i$ observes a value v that should be reported. If the leader is correct and $\Delta+\epsilon\leq\Delta_{grace}$, then the attested report in the next transmission started by any correct oracle contains v reported by $p_i$. Considering that this property is only guaranteed after GST, the inclusion follows directly from the implementation of the grace period: The leader waits at least for $\Delta_{grace}$ until it assembles the report R for a round. This allows correct oracle $p_i$ to include its observation in R, which takes up to $\Delta+2\epsilon$ for preparing and sending the OBSERVE message and for processing this by $p_l$.

As Lemma 12, assume that no correct oracle starts transmission in this report generation protocol more than $r_{max}$ times. This property follows directly from the protocol, since every correct oracle $p_i$ counts the number of rounds in a local integer variable r. In particular, $p_i$ initializes r to 0 and subsequently verifies that when an OBSERVE-REQ message arrives and the leader announces a new round, any change to r only increments r. Furthermore, $p_i$ halts the report generation when $p_l$ attempts to start a round with number greater than $r_{max}$.

Note that Lemmas 7-12 correspond to the definition of a report generation protocol. Therefore, the following result holds. There is one single instance of the transmission protocol that uses two events. The protocol is defined with respect to synchronous time. A transmit(O) event may be invoked on the transmission protocol to receive an attested report O for transmission. The algorithm performs various checks and if these succeed, it sends a transaction containing O on the Ethereum network to C. More formally, we consider two events.

transmit(O): Receives an attested report O for transmission.

send transaction with O: Sends a Ethereum transaction to C with O.

Every oracle $p_i$ locally receives a sequence of reports for transmission, where each report is identified by a unique epoch-round tuple according to the implementation of report generation. When the properties below refer to an order among reports, this always corresponds to the order given by these epoch-round tuples. For reports received for transmission, this order is the same as the order of the transmission events, according to the properties of the report generation protocol in combination with the pacemaker. However, not every correct oracle receives the same sequence of reports for transmission. The transmission protocol internally buffers every report and sends a corresponding transaction only after a predetermined delay. The protocol also has access to the most recently committed report by C on the blockchain, which is denoted by $C_O$.

A transmission protocol satisfies for each oracle $p_i$:

Liveness: When $p_i$ receives a report O for transmission and either the median observation in O differs sufficiently from the observation in the most recently buffered report L or $C_O$ is already more recent than L, then $p_i$ buffers O. Furthermore, for every buffered report O, an Ethereum transaction is sent after a predetermined delay, unless $C_O$ has meanwhile become more recent than O.

Safety: No Ethereum transaction is sent with a report O unless O has been received for transmission.

Algorithm 5 executes a transmission protocol of transmission module 108. The liveness and the safety properties follow directly from the implementation. The delay before the reports received for transmission are sent in transactions to smart contract C and the total cost incurred by the transactions executed by smart contract C on the blockchain. Here we deviate from the model of the adaptive adversary, and instead we assume the adversary chooses which oracles to compromise before the secret key x for the pseudorandom delay function becomes known to the oracles and the adversary. Recall that Algorithm 5 operates in stages according to a schedule and buffers reports for multiples of a predetermined time $\Delta_{stage}$. For convenience, we define $$s_{1\ldots j} = \sum_{i=1}^{j} s_i.$$

If none of the f faulty oracles ever sends a transaction, we have:

P [transmission takes longer than $$k \cdot \Delta_{stage}] =$$

$$1 \ldots k] = \begin{cases} \dfrac{f!(n - s_{1\ldots k})!}{(f - s_{1\ldots k})! n!} \\ 0 \end{cases}$$

P [no successful transmission in stages $s_{1,k} \leq f$.

Let c be the cost of the first transaction sent to smart contract C on Ethereum and let c' be the cost of subsequent transactions that fail. In expectation, the cost of a given schedule is:

$$E[\text{transmission cost}] =$$

$$(c - c') + \sum_{i=1}^{|S|} P[\text{no successful transmission in stages } 1 \ldots i-1] s_i c'.$$

Implementations discussed above leverage an off-chain oracle network and corresponding protocol to reduce the likelihood of damage from rogue oracles acting in concert. Periodically, the oracles, jointly and in concert, run the protocol to sign a report containing observations from many of the oracles in the network. The report is transmitted to a smart contract C running on a DLT. The smart contract C can validate the report, pay each oracle that contributed an observation to the report and expose the median, or other calculated value, of the reported values to consuming smart contracts on-chain. The protocol is resilient to different kinds of failures.

Further implementations discussed below generalize the design of the protocol, so that it may collect and report any type of data and extend the protocol to ensure a total order among the reports it produces. As one example, disclosed implementations can report transaction information from one decentralized environment (such as a first blockchain) to another decentralized environment (such as a second blockchain). Moreover, these implementations allow multiple reports to be generated in batches but still transmitted independently.

Similar to implementations disclosed above, a system in accordance with disclosed implementations can consists of a set $P=\{p_1 \ldots, p_n\}$ of n nodes, referred to as "oracles", and the oracle contract C. The oracles may send messages to each other over a network and are identified by their network endpoints, e.g., a certificate on their cryptographic key material, which allows them to authenticate to each other.

The set of oracles is determined by a configuration smart contract, which might be the same as contract C., or which could be a smart contract that is separate from contract C. The configuration contract can maintain the public keys of all participating oracles and makes these keys available to all relevant parties. Each oracle $p_i$ makes time-varying observations of a value, such as a price, or transaction data. This can be modeled as a value that $p_i$ can read at any time. Through reporting plugins, the role of observations may be adjusted to other needs as disclosed in detail below. Failures. Any $f < n/3$ oracles may exhibit Byzantine faults, which means that they may behave arbitrarily and as if controlled by an imaginary adversary.

All non-faulty oracles are called correct. For stating formal security guarantees, faults may occur adaptively, where the adversary can choose the faulty nodes on the fly. Once faulty, a node remains faulty for the purpose of the model for the entire duration of the protocol. It is expected that the protocol operates with $n=3f+1$ since this gives optimal resilience.

In principle, the failure assumption also covers network failures and crashes, which may or may not be introduced by an attacker/adversary. This assumption also means that no more than f nodes may become isolated from the network or crash. Benign faults of nodes are permitted. For example, an otherwise correct node may crash and become unresponsive for some time or it may become unreachable from some or all other correct nodes (as if during a network partition). When such a node resumes operation after recovering, it restores some state from local persistent storage and can participate in the protocol again correctly. Stated differently, a benign fault is transient in nature.

If f oracles are Byzantine-faulty and c oracles are benign-faulty with $f < n/3$ but $f+c \geq n/3$ at any point in time during the protocol execution, then: (a) the protocol may lose liveness, but (b) must always satisfies the safety properties. For supporting this refined model and thereby increasing resilience against crashes, some local state can be maintained on persistent storage in the situations noted below.

The protocol repeatedly produces reports, with the goal of having them recorded on a blockchain by the smart contract C. A configurable number of observations are aggregated into a sequenced outcome by a Byzantine faulttolerant (BFT) quorum of oracles, i.e., a set of $\lceil n+f+1/2 \rceil$ nodes. This ensures that outcomes are sequenced consistently across all correct oracles. Reports are derived from the aggregated outcomes as defined by the reporting plugin implementation disclosed in detail below. Each report is signed by f+1 oracles to guarantee that it is signed by at least one correct oracle. The report is then submitted to C which, in turn, verifies the signatures, validates the report, records which oracles contributed, and stores the consolidated report on the blockchain. The contributing oracles receive a payout.

The protocol uses public-key digital signatures, pseudo-random functions (PRF), and cryptographic hash functions. Digital signatures can be implemented using standard elliptic-curve-based schemes. For example, EdDSA and ECDSA can be used, depending on context and the target blockchain (and, in some instances the originating blockchain from which observations are made). A protocol-internal digital signature is implemented by two operations, $sign_i(m)$ and $verify_j(m, \sigma)$. A call to $sign_i$ is executed by $p_i$, takes a bit string m as input, and returns a signature $\sigma$. The operation $verify_j$ takes a string m and a potential signature $\sigma$ as inputs and returns a Boolean. The implementation satisfies that $verify_i(\sigma, m)$ returns TRUE on any correct oracle if and only if $p_i$ has executed $sign_i(m)$ and obtained $\sigma$ before, except with negligible probability. The EdDSA scheme is typically used for this purpose. Attestations can use a separate digital signature scheme with different keys; the respective operations are denoted by $signAttest_i(m)$ and $verifyAttest_j(m, \sigma)$. The attestation-signature scheme can satisfy the same properties as the internal signatures and is can be implemented by ECDSA.

A cryptographic pseudorandom function (PRF) may be implemented by HMAC-SHA256 or by Keccak256 with prepending the key to the message. Formally, the PRF $F_x$ maps strings of arbitrary length to strings of fixed length, and x is a secret key called the seed. The outputs of $F_x$ cannot be efficiently distinguished from random bit strings by anyone who does not know the secret key. SHA256 can be used as a cryptographic collision-free hash function. Invoking it on a string s of arbitrary length is denoted by H(s); this returns a fixed-length bit string. It is computationally infeasible to find collisions in H, i.e., no adversary can find s and s'/=s such that H(s)=H(s') with non-negligible probability.

The timing and network model are aligned with the partially synchronous model (a DLS88 model, for example) but can make some simplifying choices. Formally, partial synchrony means that the network is asynchronous and the clocks of the nodes are not synchronized up to some point called global stabilization time (GST). After GST, the network behaves synchronously, no oracle crashes, the clocks behave synchronously, and all messages between correct nodes are delivered within some bounded delay $\Delta$, and this remains so for the remainder of the protocol execution. In practice, a protocol may alternate multiple times between asynchronous and synchronous periods. Liveness is ensured for periods of synchrony. As a pragmatic choice, the maximal communication delay $\Delta$ can be set as a constant configured into the protocol. A more detailed discussion of the timeout values used in disclosed implementations is provided below.

The oracles may send point-to-point messages to each other over a network. All message transmissions are authenticated and encrypted, that is, each oracle can authenticate every other oracle based on the list of oracles as determined by the configuration contract on the blockchain. Messages exchanged between correct oracles should be delivered in the same order in which they were sent, i.e., the protocol uses FIFO order message delivery. Protocols are described modularly through multiple algorithms that operate concurrently on one oracle. Arriving messages addressed to a particular algorithm are also processed in the same sequence in which they are received. Note that the FIFO-order need not hold across algorithm instances. It is possible for a network partition to temporarily isolate a large number of nodes. Such partitions can model node crashes and eventual reboots as well. However, since nodes repeatedly try to send messages, all messages among correct nodes get through eventually, once any impeding network asynchrony passes.

The communication is implemented by one mutually authenticated TLS connection over the Internet for each pair of nodes. Messages sent among correct nodes are therefore delivered according to the reliable delivery semantics of TCP. A node additionally maintains buffers for sending messages over the links and may store incoming messages in buffers until the protocol is ready to process them. These buffers have finite capacity and may therefore become full. In this case, the node drops messages that do not fit in a buffer. Hence, also correct but slow nodes may behave as if they have crashed when they drop messages (this behavior has also been called an omission fault). In the sense of the formal model, nodes that drop messages are treated as Byzantine. Parts of the protocol contain explicit logic for resending messages. The other protocols transmit their point-to-point messages as described herein.

The protocol is described herein using a semi-formal description using an event-based notation, as is well-known and used in the standard literature. A protocol is written in terms of a list of upon-handlers, which may respond to events or to conditions on the protocol's internal state. Handlers are executed atomically, i.e., in a serializable and mutually exclusive way, per protocol instance and per node such that no two handler executions of the same instance interleave.

A protocol instance communicates with other instances running on the same oracle through events, which are triggered by invoke event example-event(arg1, arg2, . . . ). For each triggered event, a handler of the form upon event example-event(arg1, arg2, . . . ) do is executed once. Events between two protocol instances executing on the same node are handled in the same order in which they were triggered (i.e., in FIFO order). The execution is otherwise asynchronous, which means that the invoking protocol may only obtain output from an invoked protocol instance via further events. Sending a message to a protocol instance running on another oracle $p_j$ is triggered by send message [EXAMPLE-MESSAGE, arg1, arg2, . . . ] to $p_j$.

Messages also trigger events on a destination node, denoted upon receiving message [EXAMPLE-MESSAGE, arg1, arg2, . . . ] from $p_j$, which let the protocol handle a message from oracle $p_j$. Broadcasts can be used where an instance sends a message to all instances including itself: send message [EXAMPLE-MESSAGE, arg1, arg2, . . . ] to all $p_j \in P$. Timers are u sed throughout the protocol description. Timers are created in a stopped state. After being started, a timer times out once and then stops. A timer can be (re)started arbitrarily many times. Restarting an already running timer is the same as stopping it and then starting it afresh. Stopping a timer is idempotent. An event scheduler can be accessed through the command schedule event example-event(arg1, arg2, . . . ) after time-period, which schedules the event example-event to be invoked once time-period of time has elapsed, starting from the moment of the invocation.

A goal of the reporting protocol is to periodically send reports to the contract C, which runs on a blockchain such as Ethereum. The reporting process is configurable through reporting plugins, of which each may provide its own semantics.

Figure 3:
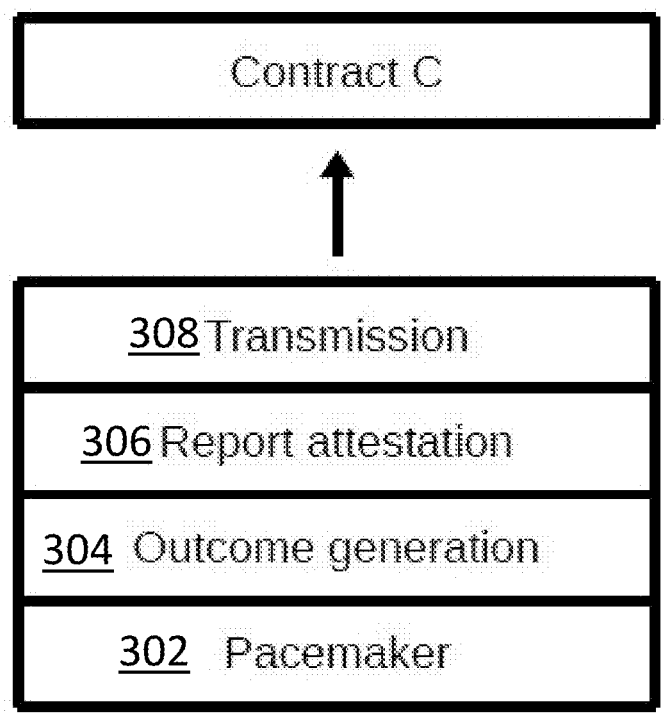
FIG. 3 is a block diagram of protocol modules in accordance with disclosed implementations.

As shown in FIG. 3, the protocol is structured into four modular algorithms, called pacemaker, (atomic) outcome generation, report attestation, and transmission. Each modular algorithm defines a protocol and can be effected as computer code instructions executing on computer processor. All four modules (also referred to as "protocols" herein) run continuously and concurrently to each. At a high level, the (atomic) outcome generation protocol is a leader-based protocol which executes in rounds. In each round it attempts to aggregate observations into outcomes, based on a query and the previous outcome, such that each outcome is assigned a unique sequence number, and the sequence of outcomes is contiguous. Every oracle computes this sequence locally, but a minority of the correct oracles may skip one or more outcomes in particular situations. Considering these potential omissions, the protocol ensures an "atomic" or total order among the outcomes that it generates at the correct oracles. In other words, it provides a service that comes close to total-order broadcast (which is often called consensus in the context of blockchains), but does not fully meet all guarantees of the latter.

Pacemaker module 302 ensures that the outcome generation module 304 makes progress, even in case of a faulty leader or a network partition. It achieves this by rotating the outcome generation protocol leader through a succession of epochs such that all oracles are guaranteed to eventually be in the same epoch long enough to make progress.

Report attestation module 306 converts aggregate outcomes into reports, according to the reporting plugin implementation described below, gathers signatures (an attestation) on the reports and hands the attested reports to transmission module 308, which in turn sends the attested reports to C.

Pacemaker module 302 ensures the progress of the outcome generation module 304. The outcome generation protocol is structured into epochs and, in each epoch, a designated oracle acts as leader to drive the aggregation of observations into sequenced outcomes, similar to related protocols for consensus like Practical Byzantine Fault Tolerance (PBFT) and HotStuff (a well-known leader-based Byzantine fault-tolerant replication protocol). All oracles can operate as followers.

Pacemaker module 302 runs continuously and periodically initiates a new epoch within the outcome generation module 304. Pacemaker module 302 instructs outcome generation to start a new epoch with a newEpochStart event. This occurs in two cases. The first case is when the epoch has run for a ρ rounds with the same epoch leader. For balancing load and trust, the leader should then change and the outcome generation protocol emits a newEpochReq event, to which the pacemaker responds. The second case occurs when the pacemaker module 302 does not observe sufficient progress by outcome generation module 304. To monitor this, pacemaker module 302 receives progress events from outcome generation. Every oracle runs a timer $T_{progress}$ with timeout duration $\Delta_{progress}$ that serves to watch the epoch leader's performance; every progress event resets that timer. When $T_{progress}$ expires, the oracle concludes that the current leader was not performing correctly. The oracle then moves to initiate a new epoch with a different leader.

Outcome generation module 304 also invokes newEpochReq events when the leader stays silent at the beginning of a new epoch for more than $\Delta_{initial}$ time. In this way, pacemaker module 302 observes the progress of the current epoch within outcome generation module 304 only through progress events. Thus, $\Delta_{progress}$ and $\Delta_{initial}$ need not depend on the worst-case transaction confirmation time on the blockchain.

Outcome generation module 304 operates in epochs, and each epoch is denoted by a unique identifier e and associated to a leader node pℓ. Within each epoch, the protocol proceeds in rounds. In each round, the protocol gathers observations and, if conditions for going forward are met, generates an aggregate outcome, which it commits to a monotonically increasing sequence number, denoted by sn, using a PBFT message pattern.

The pace of round progress is controlled by the leader through a timeout $\Delta_{round}$, triggered by the leader. It controls the minimum period of time the leader waits to start a successive round. The latency required to complete one round of the aggregation protocol during periods of synchrony and the value of $\Delta_{round}$ plus a safety margin must both be lower than $\Delta_{progress}$.

Once a sufficient number of observations are aggregated into an outcome and the outcome has been committed to a sequence number, the outcome is handed over to the to report attestation module 306. Outcome generation module 304 ensures that no two distinct correct oracles commit different outcomes to the same sequence number within and across epochs. Every outcome is committed by at least $$\left\lceil \frac{n+f+1}{2} \right\rceil - f \geq f+1$$

correct oracles, but not necessarily by all of them. Therefore, for each committed outcome, there exists at least one correct oracle that invokes the report attestation protocol with the same outcomes in the same order.

In principle, the contract C may verify that a report is valid. For preventing, however, unnecessary transmissions for invalid reports, the outcome may encode information on whether it converts into valid reports, The validity conditions depend on the implementation of the reporting plugin.

Report attestation module 306 runs continuously and is responsible for gathering signatures on the reports that are derived. When a report is signed by f+1 oracles, it is called attested. Report attestation module 306 passes the attested reports to transmission module 308 which, in turn, transmits them to C. The contract C may verify the validity of a report by verifying the report attestation. An attestation of f+1 signatures ensures that at least one correct oracle invoked report attestation module 306 with the outcome from which the report is derived and, therefore, the report satisfies the validity conditions specified in the plugin implementation as well as the safety properties guaranteed by outcome generation module 304.

Transmission module 308 encapsulates the steps performed locally by each oracle for sending attested reports to C. Unlike the above algorithms, transmission module 308 does not involve any communication among the oracles. Transmission module delays each oracle by a pseudo-randomly chosen waiting time to ensure a staged sending process. This prevents a situation in which too many copies of the same report are sent off simultaneously to C in fault-free cases. Also, this saves cost because C must process all reports it receives, even if only to discard them due to being outdated or duplicated.

A reporting plugin makes the offchain reporting protocol configurable for multiple different purposes. The plugin abstracts the data that is reported by the offchain network and contains all functions for processing and filtering them. An example is the one for reporting numerical values, which is described in more detail below.

The functions of an example plugin are summarized in Algorithm 6 and consist of one function executed only by the outcome generation protocol leader (such as outcome generation module 304), two processing functions executed by all oracles as followers in the outcome generation protocol, one processing function executed by all oracles in the report attestation protocol, one validation function for observations, two validation functions for reports, and a quorum size configuration function.

The query($O_{prev}$, sn) function is only run by the leader of the outcome generation protocol and determines a query Q, which is then sent to the followers, optionally based on the previous report $O_{prev}$. It may contain specific information on what data the followers should observe in the current round. For gathering the actual data of the observation, the oracles invoke observation($O_{prev}$, sn, Q). It simply returns an opaque value v. It may be thought of as a simple number or as a complex data structure. A number of observation-quorum( ) signed observation values are needed to generate an outcome.

The valid-observation($O_{prev}$, sn, Q, v) function determines whether the observation value v is valid. The leader uses this function to filter out invalid observations such that it sends a number of observation-quorum( ) valid observations to the followers, if available. Followers use the function to verify the validity of the observations that they receive form the leader.

Each follower uses the deterministic function outcome ($O_{prev}$, sn, Q, B), which is specific to a query Q and may depend on the previous outcome $O_{prev}$, to aggregate a list B of values observed by different oracles to an outcome O.

Algorithm 6: Example of an Interface of a reporting plugin
  state
  //A reporting plugin gets to define its own state that the various functions can access and modify.
  function query($O_{prev}$, sn)
  //Executed only by the epoch leader.
  //Provides a useful coordination mechanism in case there are many possible things that could be "observed."// Produces a query that is sent to the followers.
  function observation($O_{prev}$, sn, Q)
  //Produces an observation for sequence number sn.
  //The observation may depend on the query Q and/or on the previous outcome $O_{prev}$. //Returns an observation.
  function valid-observation($O_{prev}$, sn, Q, v)
  //Validity conditions may depend on the query Q and/or on the previous outcome $O_{prev}$.
  //Returns TRUE if the observed value v satisfies specific to the plugin validity conditions, FALSE otherwise.
  function observation-quorum( )
  //Returns the number of observations needed to build a report.
  function outcome($O_{prev}$, sn, Q, B)
  //Given the query Q and the previous outcome $O_{prev}$, aggregates the vector of observations B for sequence
  //number sn according to an aggregation policy. Must be deterministic. //Returns the aggregated outcome.
  function reports(sn, O)
  //Used by the report attestation protocol to transform the outcome O to a variable-length vector of reports.
  //Returns a vector of reports.
  function should-accept-attested-report(a)
  //Used by the transmission protocol to decide whether an attested report should be accepted.
  //This is invoked after a report has been attested. //Returns a Boolean.
  function should-transmit-accepted-report(a)
  //Used by the transmission protocol to decide whether an attested report should be sent to C.
  //This is invoked just before transmission potentially takes place.
  //Returns a Boolean.

The reports(sn, O) function is used by the report attestation protocol to transform the previously computed outcome O into a vector (variable-length array) of reports, such that the report attestation protocol collects signatures on all reports.

Finally, two filtering functions should-accept-attested-report(a) and should-transmit-accepted-report(a) are used by the transmission protocol for reducing the number of reports that are unnecessarily transmitted to contract C. Their parameter is an attested report a. For example, they can ensure that a report is not transmitted when C has already obtained another report that was produced more recently.

For reasoning about the progress of the configurable reporting protocol, it is assumed that every function of a reporting plugin returns within $\Delta_{process}$ time units. Notice that all functions receive a sequence number sn, either explicitly or implicitly sent as part of an attested report(a). The details of how these functions are invoked described below.

The reporting plugin for numerical values produces reports that collect numerical values representing different observations of the same offchain signal, such as a price feed. The reporting plugin for numerical values is just one example of possible plugins in accordance with the disclosed implementations. This reporting plugin produces reports that represent the median value of more than 2f observations.

Contract C is managed by an owner entity (person, group, device, or other entity) with administrative powers. The owner can modify the oracle set by adding or removing oracles. When the owner modifies the oracle set, an event is emitted by the contract on the blockchain informing the oracles about the new configuration of the offchain network. The owner can be instantiated issuing known authentication and authorization mechanisms. In practice, trust-minimization considerations would suggest using a contract that limits the power of malicious actors, for example, by requiring multiple signatures by independent parties or enforcing a waiting period before changes can be enacted.

Contract C records the reports, each of which contains the sequence number sn assigned by the atomic outcome generation protocol. More precisely, the plugin function reports (sn, O) was used to derive a report vector from an outcome O, where the outcome generation protocol has committed sn to O. Every report is therefore associated with a tuple (sn, pos), where pos denotes the position of the report in the vector of reports. When C receives a transmission containing a report R with a higher sequence number than C has seen so far, C updates its record and exposes this to consuming contracts. Transmissions with a smaller sequence number are typically ignored because they were produced strictly earlier. The position of a report with respect to the others with the same sequence number is left to the application for interpretation. The function provided by the contract complements the reporting plugin. For example, with the reporting plugin for numerical values, C records the median of all observation values in the report.

The pacemaker protocol in Algorithm 7 below governs progression through epochs numbered in succession 1,2,3, . . . and the choice of the epoch leader. For each epoch, the outcome generation protocol in Algorithms 3-6 produces up to ρ outcomes, at most one per round. If the outcome generation protocol does not produce an outcome after $\Delta_{progress}$ units of time from the beginning of the epoch or the previous outcome, the oracle initiates a switch to the next epoch, and the corresponding next leader. Algorithm 7 includes a mechanism to tolerate lossy links, such that messages sent between correct oracles do not need to be buffered.

Every oracle $p_i$ maintains a local variable e, which denotes the epoch in which $p_i$ operates. Furthermore, a variable $\ell$ denotes the leader oracle p$\ell$ of the current epoch, derived from e as $\ell \leftarrow$ leader(e). The variable ne tracks the highest epoch number the oracle has sent in a NEW-EPOCH-WISH message. These variables are maintained on persistent storage. The node broadcasts a NEW-EPOCH-WISH message containing ne every $\Delta_{resend}$ seconds. This increases the probability that relevant NEW-EPOCH-WISH messages get through, even if a message is dropped at some point. It also helps for integrating crashed oracles back into the protocol after they have recovered. Incorrect behavior by the current leader p$\ell$ is determined by oracle $p_i$ if $p_i$ has not committed an outcome by timeout $\Delta_{progress}$.

The oracle stores the highest epochs received from all other oracles through NEW-EPOCH-WISH messages in an array newEpochWishes. If an oracle receives more than f messages of the form [NEW-EPOCH-WISH, e'], each one containing some e'>e, it infers that at least one correct node wishes to progress to some epoch e⁻ higher than e. The node chooses e⁻ as the (f+1)-highest entry of newEpochWishes and sends out its own [NEW-EPOCH-WISH, e⁻] message. Since it is assumed that at most f nodes are Byzantine, receiving a message from more than f others implies that at least one correct node has earlier sent a [NEW-EPOCH-WISH, e'] message with e'≥e⁻.

Note that e⁻ is an arbitrary future epoch, not necessarily the next epoch from the receiving oracle's perspective. This allows the oracle to catch up if it misses messages pertaining to an entire epoch or more. Correct nodes may also exhibit benign faults and be offline for some time. If f is close to n/3, this doesn't matter too much, since the protocol will not actually advance unless close to ⅔ of the nodes positively respond with NEW-EPOCH-WISH messages. For smaller f, though, arbitrary delays could lead to multiple distinct perspectives on the current epoch.

The node continuously records the highest epoch numbers received from all others through NEW-EPOCH-WISH messages. If a node observes 2f nodes wish to change to an epoch greater than e, the node switches to epoch e⁻, where e⁻ is the (2f+1)-highest entry of newEpochWishes. It then triggers a corresponding newEpochStart ("e, $\ell$), which will be picked up by the outcome generation protocol.

Because more than 2f nodes indicated epoch e⁻ or greater, the node infers that more than f correct nodes wish to switch to a later epoch. This, in turn, implies that every correct node will receive more than f NEW-EPOCH-WISH messages as well, since a correct node will send those message to all others. Hence, all correct nodes will eventually transmit a NEW-EPOCH-WISH message containing epoch at least e⁻, according to the NEW-EPOCH-WISH amplification rule, and move to a new epoch e⁻ outcome generation protocol.

Crashes and recoveries. At any time, some number c of nodes may exhibit benign faults and have crashed; they eventually will recover and resume operations (otherwise, they count as Byzantine). When a node resumes after a crash, it restarts all running algorithms and restores certain variables from persistent storage.

In the following, assume that there are no simultaneous Byzantine faults and consider these scenarios:

c≤f: When no more than f oracles have crashed, the protocol maintains liveness and progresses normally (based on the assumption that there are no further Byzantine faults). When an oracle crashes in some epoch e, it misses all messages sent until it recovers. Upon recovery, it will eventually receive more than f NEW-EPOCH-WISH messages containing an epoch larger than ne (recall that ne is restored from persistent storage upon recovery). This oracle will then rejoin the protocol by sending a NEW-EPOCH-WISH message itself, denoting an epoch larger than ne.

c>f: During the time when more than f oracles have crashed, the protocol loses liveness. The pacemaker protocol will resume operations successfully once n−f oracles are operating and more than f among them send a NEW-EPOCH-WISH message with an epoch value of at least some e after recovery. This ensures that, eventually, more than f oracles send their own NEW-EPOCH-WISH message with an epoch of at least e and, in turn, all correct oracles announce epoch values e'≥e. This implies that the correct oracles eventually start epoch at least e.

The pacemaker protocol is able to resume after the crash and subsequent recovery of any number of correct nodes. Observe first that the protocol ensures that for every correct oracle, the variable ne increases monotonically and, likewise, no entry in newEpochWishes ever decreases. This follows directly from the protocol. Furthermore, notice that ne≥e holds as well from the assignment to ne in the agreement rule and from the preceding reasoning. And since e is determined from the entries of newEpochWishes that never decrease, also e increases monotonically.

Consider now a point in time when all correct nodes have recovered, there are Byzantine-faulty nodes, but the network timing has stabilized (i.e., a moment after GST). A stable situation also means that when the outcome generation protocol operates with a correct leader that has started the same epoch for all correct oracles, this produces outcomes (and progress events) faster than $\Delta_{progress}$; hence, no correct oracle times out on $T_{progress}$ and initializes a further epoch like this. Moreover, this allows oracles to receive messages from a correct leader on less time that $\Delta_{initial}$ from the beginning of the epoch. In this situation, correct oracles that have recovered may have missed arbitrarily many messages. Hence, their locally highest epochs (stored in ne) may vary widely. However, since all correct nodes resume the periodic transmission of NEW-EPOCH-WISH messages, every correct node will soon receive n−f NEW-EPOCH-WISH messages and determine an epoch number e⁻ in the NEW-EPOCH-WISH amplification rule that is reported by more than f nodes. Notice that e⁻≥ne for the local variable ne of at least one correct node $p_j$. However, it may be that e⁻ is larger than the highest epoch for which any correct node has invoked a newEpochStart event.

Algorithm 7: Pacemaker protocol structured into epochs (executed by every oracle $p_i$).

state
  (e, $\ell$) ← (1,leader(1)): current epoch and leader
  ne ← e: highest epoch which $p_i$ has initialized, i.e., highest epoch for which it has sent a NEW-EPOCH-WISH message newEpochWishes ← [0]$^n$: highest epoch received from $p_j$ in a NEW-EPOCH-WISH message timer $T_{progress}$ with timeout duration $\Delta_{progress}$ // leader must produce reports with this frequency, or be removed timer $T_{resend}$ with timeout duration $\Delta_{resend}$ // controls resending of NEW-EPOCH-WISH messages
  upon initialization do
  invoke event newEpochStart(e, $\ell$) // see outcome generation protocol in Alg. 3 start timer $T_{progress}$
  upon event progress do // the current leader is progressing with the outcome generation protocol (see Alg. 6)
  restart timer $T_{progress}$
  upon event timeout from $T_{resend}$ do // resend NEW-EPOCH-WISH message every $\Delta_{resend}$ seconds
  sendNewEpoch Wish( )
  upon event timeout from $T_{progress}$ or event newEpochReq do     // abort epoch because leader is too slow or tenure is over
  stop timer $T_{progress}$
  ne ← max{e + 1,ne}
  sendNewEpoch Wish( )
  upon receiving a message [NEW-EPOCH-WISH, e'] from $p_j$ do newEpochWishes[j] ← max(e',newEpochWishes[j])
  upon $|\{p_j \in \mathcal{P} \mid \text{newEpochWishes}[j] > ne\}| \geq f + 1$ do     // NEW-EPOCH-WISH amplification rule
  $\tilde{e} \leftarrow \max\{e' \mid |\{p_j \in \mathcal{P} \mid \text{newEpochWishes}[j] \geq e'\}| \geq f + 1\}$
  ne ← max(ne,e$^-$) sendNewEpochWish( )
  upon $|\{p_j \in \mathcal{P} \mid \text{newEpochWishes}[j] > e\}| \geq 2f + 1$ do     // agreement rule
  $\tilde{e} \leftarrow \max \{e' \mid \{p_j \in \mathcal{P} \mid$
      (     newEpochWishes[j] $\geq e'$} $ | \geq 2f + 1$}
  (e, $\ell$) ← e,$^-$ leader$^{(e)}$)ne ← max{ne,e}
  restart timer $T_{progress}$
  invoke event newEpochStart(e, $\ell$) // see outcome generation protocol in Alg.3
  function sendNewEpochWish( ) send message [NEW-EPOCH-WISH,ne] to all $p_j \in$ P restart timer $T_{resend}$

---

Let $p_s$ be some node with the (f+1)-largest value of the ne variables among the n−f correct nodes, and let $e_s$ denote this epoch number. According to the protocol, f+1 or more correct oracles will repeatedly send NEW-EPOCH-WISH messages containing an epoch value of at least $e_s$. Since these messages are sent by correct oracles, every correct oracle will eventually have received at least f+1 such NEW-EPOCH-WISH messages and send a NEW-EPOCH-WISH message with parameter $e_s$ or higher as well. This implies that every correct oracle eventually stores n−f>2f entries in newEpochWishes that are at least $e_s$. Hence, every correct oracle has either already invoked a newEpochStart event for epoch $e_s$ or will progress to epoch $e_s$ and invoke a newEpochStart event for epoch $e_s$.

It remains to show that no correct oracle has yet progressed to some epoch e'>$e_s$. This follows easily, considering the monotonically increasing variables e and ne of each correct oracle: In order to progress to some epoch e'>$e_s$, a correct oracle would need more than 2f entries in newEpochWishes containing e' or a higher value. Hence, accounting for f values reported by faulty oracles, more than f correct oracles would have sent NEW-EPOCH-WISH messages containing e' or a larger value. However, the number of correct nodes whose ne variable may exceed $e_s$ and that might actually have sent NEW-EPOCH-WISH messages with parameter larger than $e_s$ is at most f, according to the definition of $e_s$. This is a contradiction and shows that such an e' does not exist.

The leader function. The function leader: N→{1, . . . , n} maps epochs to leaders. It is important that it is balanced in the sense that for any long interval of epochs, every oracle becomes leader approximately equally often. It must be deterministic and computable by every oracle. A trivial implementation is to set leader(e)=(e mod n)+1.

The ordering of the oracles can be determined by the list in the configuration contract. If this order may be influenced by the oracles (for example, when ordered by their identifying public keys), this may provide an opportunity for a coalition of faulty oracles to arrange themselves consecutively, which could lead to long delays between correct operations of the protocol. The leader function can be implemented using a pseudo-random function (PRF) to avoid this risk. This has the advantage that the leader sequence remains unpredictable to any observer outside the set of oracles, ensuring that an external adversary cannot predict and attack the leader of a particular future epoch. We use the PRF to calculate a random permutation π of {$p_1$, . . . , $p_n$} that applies to a span of n epochs. The leader of each epoch i∈{1, . . . , n} in the span is π[i].

The outcome generation protocol proceeds in epochs, where each epoch consists of multiple rounds. We first describe the protocol proceeds through the rounds within an epoch and then how it switches to another epoch. All oracles start a new epoch e upon receiving a newEpochStart (e, $\ell$) event, where $\ell$ identifies a dedicated oracle which acts as epoch leader. All oracles, including the epoch leader, act as followers. Each epoch runs until the pacemaker determines that the subsequent epoch should be started or until it has executed ρ rounds.

In each round all correct oracles should commit a single outcome O to a sequence number sn. Rounds are executed consecutively; a correct oracle does not enter a new round before committing an outcome to a sequence number for the previous round. Sequence numbers are contiguous and increase monotonically with the rounds of an epoch. Moreover, the sequence number is maintained across epochs. The first round of an epoch has a sequence number at least as high as the last round of some previous epoch(s).

Note that a minority of correct oracles, particularly those that have been slow in previous epochs, may have jumped to this epoch without committing an outcome in the last rounds of one (or more) previous epoch(s). Therefore, the sequence of committed outcomes at these oracles may contain a gap. However, it is ensured that for every sequence number, a majority among the correct oracles commits the outcome. Algorithms 8-11 describe how oracles aggregate observations to an outcome, commit to an outcome, and trigger the report attestation protocol with committed the outcome. The pseudocode mixes actions performed by the leader with those of the followers and orders them according to a failure-free run of the protocol.

Algorithm 8: Atomic outcome generation protocol, executed by oracle $p_i$ (part 1)

state $(e, \ell) < (1, \text{leader}(1))$: current epoch and leader sn ← 0: the sequence number for the current round query ← ⊥: the query for the current round prevOutcome ← ⊥: the outcome committed to sequence number sn − 1 outcome ← ⊥: the outcome for the current round prepareMsgs ← $[⊥]^n$: a vector of received PREPARE messages for the current round per oracle ID preparedSeqNo ← ⊥: the highest sequence number with a prepared outcome preparedOutcome ← ⊥: the last prepared outcome prepareQC ← $[⊥]^n$: the highest available quorum of PREPARE messages firstSnOfEpoch ← 0: connects sequence numbers to the round numbers of the current epoch commitMsgs ← $[⊥]^n$: a vector of received COMMIT messages for the current round per oracle ID committedSeqNo ← 0: the highest sequence number with a committed outcome committedOutcome ← ⊥: the last committed outcome commitQC ← $[⊥]^n$: the highest available quorum of COMMIT messages phase ← ⊥: denotes the phase in Φ as a follower within a round timer $T_{initial}$ with timeout duration $\Delta_{initial}$, initially stopped // state only updated by the epoch leader timer $T_{round}$ with timeout duration $\Delta_{round}$, initially stopped timer $T_{grace}$ with timeout duration $\Delta_{grace}$, initially stopped waited ← TRUE: denotes whether the next round may start because $T_{round}$ has expired observations ← $[⊥]^n$: vector of observations received for the current round newEpochReqMsgs ← $[FALSE]^n$: a vector indicating if a EPOCH-START-REQ message is received in the current epoch per oracle ID (highSn,highQCTag) ← (0,⊥): a pair of highest sequence number from EPOCH-START-REQ messages in the current epoch and corresponding PREPARE or COMMIT tag highQC ← $[⊥]^n$: highest prepare- or commit-quorum certificate from EPOCH-START-REQ messages highQCProof ← $[⊥]^n$: highest prepare- or commit-quorum certificate proof for the current epoch leaderPhase ← ⊥: denotes the phase in Λ as a leader within a round upon event newEpochStart $(\dot{e}, \dot{\ell})$ do $(e, \ell) \leftarrow (\dot{e}, \dot{\ell})$ start timer $T_{initial}$ if committedSeqNo < preparedSeqNo then $\sigma \leftarrow \text{sign}_i(\text{EPOCH-START-REQ}||e||\text{preparedSeqNo}||\text{PREPARE})$ send message [EPOCH-START-REQ,e, PREPARE,preparedSeqNo,preparedOutcome, prepareQC,σ] to $p_\ell$ else $\sigma \leftarrow \text{sign}_i(\text{EPOCH-START-REQ}||e||\text{committedSeqNo}||\text{COMMIT})$ send message [EPOCH-START-REQ,e, COMMIT,committedSeqNo,committedOutcome, commitQC,σ] to $p_\ell$ phase ← NEW-EPOCH if $i = \ell$ then // executed only by epoch leader $p_\ell$ (highSn,highQCTag) ← (0,⊥)

newEpochReqMsgs ← $[FALSE]^n$ highQC ← $[⊥]^n$ leaderPhase ← NEW-EPOCH

---

Algorithm 9: Atomic outcome generation protocol, executed by oracle $p_i$ (part 2)

upon receiving message [EPOCH-START-REQ,é, qcTag,ṡn,outcomé, QC,σ] from $p_j$ s.t.

$i = \ell \wedge \dot{e} = e \wedge \neg\text{newEpochReqMsgs}[j] \wedge \text{leaderPhase} = \text{NEW-EPOCH}$ do // only epoch leader $p_\ell$ newEpochReqMsgs[j] ← TRUE highCertOutcome ← ⊥ if $\text{verify}_j \text{EPOCH-START-REQ}||e||\dot{sn}||\text{qcTag},\sigma) \wedge \text{validQC}(\dot{sn},\text{outcomé},\text{qcTag},QC)$ then if $\dot{sn} > \text{highSn}$ then (highSn,highQCTag) ← (ṡn,qcTag)

(highCertOutcome,highQC) ← (outcomé,QC) highQCProof[j] ← (ṡn,qcTag,σ)

if $|\{p^j \in \mathcal{P} | \text{newEpochReqMsgs}[j]\}| = BQ(n, f)$ then send message [EPOCH-START,e,highSn,highQCTag,highCertOutcome,highQC,highQCProof] to all $p_j \in P$ if highQCTag = COMMIT then leaderPhase ← SENT-EPOCHSTART else leaderPhase ← SENT-PROPOSAL upon event timeout from $T_{initial}$ do invoke event newEpochReq // see pacemaker protocol in Alg. 2 upon receiving message [EPOCH-START,é,highṠn,qcTag,outcomé,highQC,highQCProof] from $p_\ell$ s.t.

$\dot{e} = e \wedge \text{phase} = \text{NEW-EPOCH}$ do if $|\{p^j \in \mathcal{P} | \text{highQCProof}[j] = (sn',tag, \sigma) \wedge sn' = \text{highṠn} \wedge \text{verify}_j(\text{EPOCH-START-REQ}||e||\dot{sn}||poc, \sigma)\}|$ ≥ BQ(n,f) ∧ validQC(highṠn,outcomé,qcTag,highQC) then sn ← highṠn firstSnOfEpoch ← sn + 1 outcome ← outcomé if qcTag = PREPARE then $\sigma \leftarrow \text{sign}_i(\text{PREPARE}||e||sn||H(\text{outcome}))$ send message [PREPARE,e,sn,σ] to all $p_j \in P$ phase ← SENT-PREPARE else // qcTag = COMMIT if sn > committedSeqNo then committedSeqNo ← sn committedOutcome ← outcome commitQC ← highQC invoke event committedOutcome(sn,(outcome,commitQC)) // see report att. protocol in Alg. 7 phase ← NEW-ROUND cancel timer $T_{initial}$ function validQC $(sn',O, qcTag,QC)$ return $\exists$ ṡ s.t. $|\{p_j \in \mathcal{P} | QC[j] = qcTag,\dot{e},\dot{sn},\sigma] \wedge \text{verify}_j qcTag||e||\dot{sn}||H(O),\sigma\}| \geq BQ(n, f)$ upon event timeout from $T_{round}$ s.t. $i = \ell$ do // current round may be in any phase, executed only by epoch leader $p_\ell$ waited ← TRUE upon waited $\wedge i = \ell$ // executed only by epoch leader $p_\ell$ $\wedge$ (leaderPhase = SENT-EPOCHSTART $\vee$ leaderPhase = COMMITTED) do query ←

-continued

---

Algorithm 9: Atomic outcome generation protocol, executed by oracle $p_i$ (part 2)

--- query(highCertOutcome,sn + 1) send message [ROUND-START,e,sn + 1,query] to all $p_j \in P$ observations ← $[\bot]^n$ start timer $T_{round}$
    leaderPhase ← SENT-ROUNDSTART waited ← FALSE

---

Algorithm 10: Atomic outcome generation protocol, executed by oracle $p_i$ (part 3)

--- upon receiving message [ROUND-START, é,śń,querý] from $p_\ell$ s.t.
é = e $\wedge$ śń = sn + 1 $\wedge$ phase = NEW-ROUND do
  if śń − firstSnOfEpoch > ρ then // $p_\ell$ has exhausted its maximal number of rounds invoke event newEpochReq // see pacemaker protocol in Alg. 2 return
  query ← querý
  v ← observation(outcome,śń,querý) σ ← sign$_i$(OBSERVATION‖e‖sn + 1‖querý‖v) send message [OBSERVATION,e,sn + 1,v,σ] to $p_\ell$
  (prepareMsgs, commitMsgs) ← $([\bot]^n, [\bot]^n)$phase ← SENT-OBSERVATION
upon receiving message [OBSERVATION,é,śń,v,σ] from $p_j$ s.t. // executed only by epoch leader $p_\ell$ é = e $\wedge$ i =
$\ell$ $\wedge$ śń = sn + 1 $\wedge$ observations[j] = $\bot$ $\wedge$ valid-observation (prevOutcome,sn',query,v)
  $\wedge$ verify$_j$(OBSERVATION‖é‖sn + 1‖query‖v,σ) $\wedge$ leaderPhase $\in$ { SENT-ROUNDSTART, GRACE} do
observations[j] ← (v,σ)
  upon |{$p_j \in P$|observations[j]/= $\bot$}| = observation-quorum( ) $\wedge$ i   // executed only by epoch leader
=$\ell$                                                                                $p_\ell$
  $\wedge$ leaderPhase = SENT-ROUNDSTART do
  start timer $T_{grace}$                                                       // grace period for slow oracles
  leaderPhase ← GRACE
upon event timeout from $T_{grace}$ s.t. i = $\ell$ $\wedge$ leaderPhase = GRACE
do                                                          // executed only by epoch leader $p_\ell$
  k ← 1 // collect observations in B and signatures in Σ for $p_j \in P$ s.t. observations[j]/= $\bot$ $\wedge$ observations[j]
= (v,σ) do B[k] ← (j,v) Σ[k] ← σ
  k ← k + 1
  send message [PROPOSAL,e,sn + 1,B,Σ] to all $p_j \in P$ leaderPhase ← SENT-PROPOSAL
upon receiving message [PROPOSAL, é, $^{sń, B, Σ]}$ from $p_\ell$ s.t.
é = e $\wedge$ śń = sn + 1 $\wedge$ phase = SENT-OBSERVATION do
  observation-quorum( ) ',query,v) if $\vee_{k=1}^V$ B[k]/= $\bot$ $\wedge$ B[k] = (j,v) $\wedge$ valid-observation(prevOutcome,sn
  $\wedge$ verify$_j$ OBSERVATION‖e‖sn + 1‖query$^{‖v, Σ[k])}$ then sn ← śń
prevOutcome ← outcome
  outcome ← outcome(prevOutcome,sn,query,B) // outcome( ) is deterministic σ ←
sign$_i$(PREPARE‖e‖sn‖H(outcome)) send message [PREPARE,e,sn,σ] to all $p_j \in P$ phase ← SENT-PREPARE
  upon receiving message [PREPARE, é,$^{sń,σ}$] from $p_j$ s.t. é = e $\wedge$ śń = sn $\wedge$ prepareMsgs[j] = $\bot$
  $\wedge$ verify$_j$ PREPARE‖e‖sn‖H(outcome)$^{,σ)}$ $\wedge$phase = SENT-PREPARE do prepareMsgs[j] ←
[PREPARE, e,sn,σ]

---

Algorithm 11: Atomic outcome generation protocol, executed by oracle $p_i$ (part 4)

--- upon |{$p_j \in \mathcal{P}$ |prepareMsgs[j] $\neq \bot$}| ≥ BQ(n, f) $\wedge$ phase = SENT-PREPARE do σ ←
sign$_i$(COMMIT‖e‖sn‖H(outcome)) send message [COMMIT, e, sn, σ] to all $p_j \in P$
  phase ← SENT-COMMIT preparedSeqNo ← sn preparedOutcome ← outcome prepareQC ← prepareMsgs
  upon receiving message [COMMIT, e', sn', σ] from $p_j$ s.t. e' = e $\wedge$ sn' = sn $\wedge$ phase = SENT-COMMIT $\wedge$
commitMsgs[j] = $\bot$ $\wedge$ verify$_j$COMMIT‖e‖sn‖H(outcome), σ do commitMsgs[j] ←
[COMMIT, e, sn, σ]
  upon |{$p_j \in \mathcal{P}$ |commitMsgs[j] $\neq \bot$}| ≥ BQ(n, f) $\wedge$ phase = SENT-COMMIT do phase ← NEW-ROUND if p =
$\ell$ then leaderPhase ← COMMITTED
  committedSeqNo ← sn committedOutcome ← outcome commitQC ← commitMsgs
  invoke event committedOutcome(sn, (outcome, commitQC)) // see report attestation protocol in Alg. 7
invoke event progress // indicates leader is performing correctly, see pacemaker protocol in Alg. 2 function $BQ(n, f)$ return $\left\lceil \dfrac{n+f+1}{2} \right\rceil$

---

Every round is structured into phases. The epoch leader $p\ell$ concurrently executes steps as the leader and as a follower. The follower progress is controlled by a variable phase, as for all oracles, whereas the progress of $p\ell$ as a leader uses a variable leaderPhase. The epoch's time duration is controlled by the pacemaker protocol. We say that an oracle finishes an epoch gracefully if it commits some outcome to a sequence number for all ρ rounds of the epoch, before the epoch expires. Otherwise, we say that the oracle finishes the epoch ungracefully.

At the beginning of a new epoch e, all oracles send to $p\ell$ an EPOCH-START-REQ message as followers to inform the leader about their state in the previous epoch. The leader, upon receiving a BFT quorum, i.e., a set with cardinality $$\left\lceil \frac{n+f+1}{2} \right\rceil,$$

of EPOCH-START-REQ messages sends a new-epoch quorum certificate (denoted highQC) in a EPOCH-START message. The new epoch quorum certificate determines a sequence number $sn_{high}$ as well as an outcome $O_{highCert}$ from some previous epoch that should be committed to sequence number $sn_{high}$. The leader starts the epoch with $sn=sn_{high}+1$. This guarantees the consistency of the outcome generation protocol: if there exists some correct oracle which committed the outcome $O_{highCert}$ to sequence number $sn_{high}$ in some epoch e'<e, then no correct oracle commits a conflicting outcome to $sn_{high}$ in epoch e' or higher.

Figure 4:
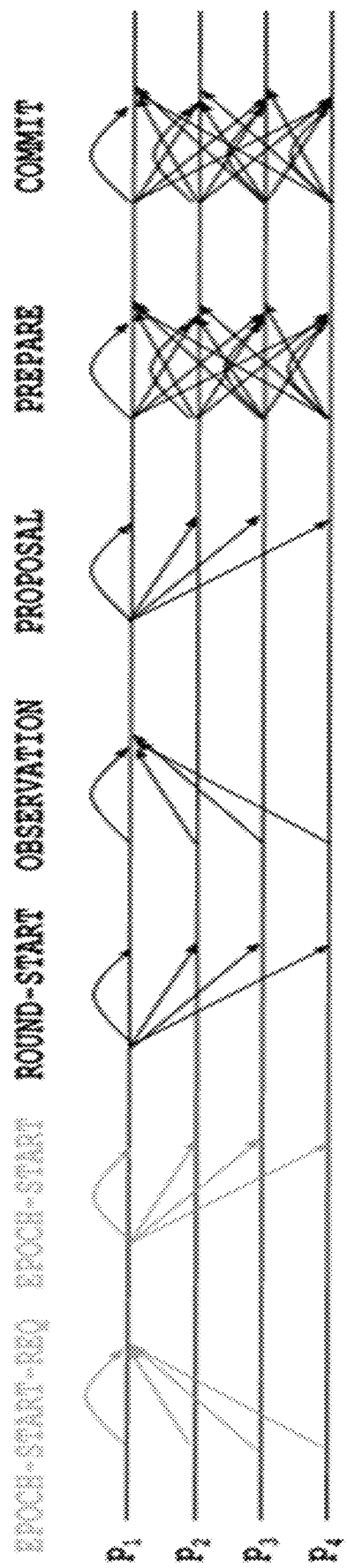
FIG. 4 is a protocol timing diagram in accordance with disclosed implementations.

FIG. 4 illustrates the first round of the outcome generation protocol in a fault-free execution with $p_1$ as epoch leader. Subsequent rounds start with the ROUND-START and previous messages (shown in grey) are skipped. All oracles start a timer $T_{initial}$ with duration $\Delta_{initial}$ at the beginning of a new epoch. Upon receiving a EPOCH-START message, an oracle cancels $T_{initial}$. The timer's duration $\Delta_{initial}$ should be shorter than $\Delta_{progress}$, as this allows oracles to terminate an epoch fast in case the leader is not responsive right at the beginning of the epoch. As the first step of each round, the leader sends a [ROUND-START, e, $sn'$, Q] message to all oracles, where e is the current epoch and $sn'=sn+1$ is the sequence number for which the leader wants to generate an outcome in the current round. The variable sn is incremented only in a later phase of the round (after receiving the PROPOSAL message). The query Q is stored in query during the remainder of the round. The leader obtains Q by calling query($O_{highCert}$, $sn'$), where $O_{highCert}$ denotes the most recently committed outcome as determined by the leader, i.e., the outcome committed with sequence number $sn'-1$. For controlling the pace of the protocol, the leader also starts a timer $T_{round}$ that expires after $\Delta_{round}$.

An oracle $p_i$ accepts a message [ROUND-START, e', $sn'$, Q] if it is currently in epoch e=e' and has committed an outcome for sequence number sn=$sn'$-1. Upon accepting the ROUND-START message, $p_i$ enters the new round. It evaluates observation($O_{prev}$, $sn'$, Q), which returns an observation value $v_i$ that may depend on the query Q and the previous outcome $O_{prev}$. Then, $p_i$ sends back to the leader the message [OBSERVATION, e, $sn'$, $v_i$, $\sigma_i$], where $\sigma_i$ is $p_i$'s signature on the OBSERVATION message and the query Q.

The leader waits for observation-quorum( ) valid OBSERVATION messages. An OBSERVATION message sent by oracle $p_i$ for sequence number $sn'$ is considered valid if it contains a valid signature $\sigma$; and, moreover, the plugin function valid-observation($O_{sn'-1}$, $sn'$, Q, $v_i$) returns TRUE. Having gathered observation-quorum( ) many valid OBSERVATION messages, the leader waits out a grace period of duration $\Delta_{grace}$ so that delayed observations may also be included in the report. When the grace period expires, the leader collects all observations in a vector B and all corresponding signatures in a vector $\Sigma$ and sends them to the oracles in a [PROPOSAL, e, sn, B, $\Sigma$] message.

When an oracle $p_i$ receives the PROPOSAL message for the current epoch e and the sequence number sn of the round with a vector of observation-quorum( ) distinct and valid observations and a vector of valid corresponding signatures, it invokes the plugin function outcome($O_{prev}$, sn, Q, B). The latter returns an outcome O based on the vector of observations, on the query Q, and on the previous outcome $O_{prev}$, committed to sequence number sn−1. The outcome( ) function is deterministic, so that all correct oracles obtain the same outcome O. Then $p_i$ sends a message [PREPARE, e, sn, $\sigma_i$] to all oracles, where $\sigma_i$ is $p_i$'s signature on [PREPARE, e, sn, H(O)], where H denotes a cryptographic hash function. Note that no correct oracle will accept a PREPARE message before the corresponding PROPOSAL message and, hence, if the leader is correct, all correct oracles have the state needed to validate the signatures available locally.

When an oracle $p_i$ has obtained a BFT quorum of PREPARE messages with valid signatures that match its local outcome O, it sends to all oracles a [COMMIT, e, sn, $\sigma_i$] message, where $\sigma_i$ is $p_i$'s signature on [COMMIT, e, sn, H(O)], as before. When the first correct oracle does this, we say that the outcome is prepared. The oracle persists in storage the last prepared outcome O in a preparedOutcome variable and its sequence number sn in a preparedSeqNo variable.

When $p_i$ receives a BFT quorum of matching COMMIT messages with valid signatures that also match its local state, the oracle commits its locally evaluated round outcome O to sn, and passes to the report attestation protocol sn and its corresponding certified outcome, i.e., the outcome O, and BFT quorum of distinct signed COMMIT messages for O from epoch e. The oracle persists in storage the last committed outcome O in a committedOutcome variable and its sequence number sn in a committedSeqNo variable. Finally, $p_i$ issues a progress event to the calling pacemaker protocol and completes the round.

After the epoch leader p$\ell$ has completed the round, it becomes ready to initiate the next round. The leader starts a new round whenever the previous round has completed and $\Delta_{round}$ units of time have passed since starting the previous round, as controlled by a timer $T_{round}$. This means it waits for whichever event arrives later. The frequency of starting rounds therefore depends, to some extent, on the duration of executing rounds. By setting $\Delta_{round}=0$, this enables the outcome generation protocol to commit outcomes as fast as the network permits.

The outcome generation protocol prevents that a leader runs for more than $\rho$ rounds, where $\rho$ is a global parameter. This is to avoid that a malicious leader drives the protocol forward as quickly as possible and causes a denial-of-service attack, for instance through oracles exhausting their computational or network capacity, or by making oracles hit some limits. In particular, when the leader attempts to start more than $\rho$ rounds in the same epoch and a correct oracle receives a corresponding NEW-ROUND message as a follower, it does not start that round. Instead, the oracle signals this to the pacemaker protocol with a newEpochReq event and halts any further processing in the current epoch. It stays in phase NEW-ROUND, and the only way to continue the protocol is by responding to a newEpochStart event with a higher epoch number.

Figures 5A, 5B:
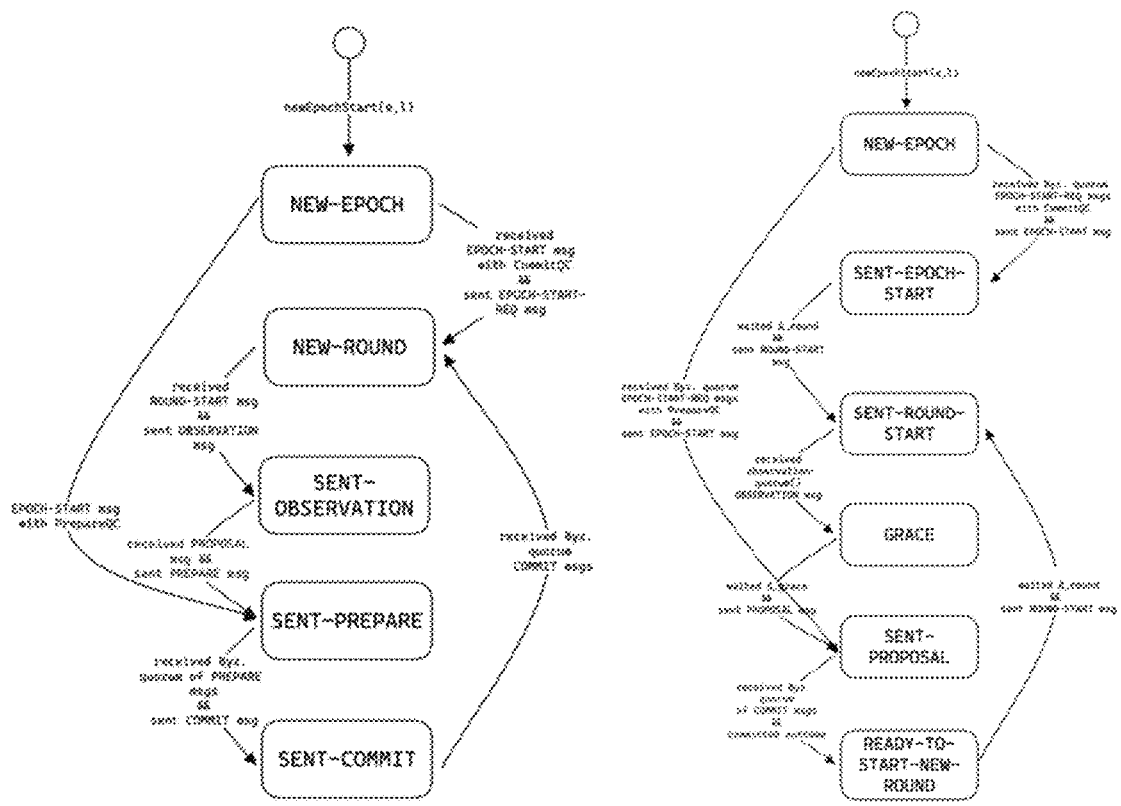
FIG. 5a is a state diagram of follower phases in accordance with disclosed implementations.
FIG. 5b is a state diagram of leader phases in accordance with disclosed implementations.

FIGS. 5a and 5b illustrates state diagrams of an oracle for the roles as follower and leader (for epochs where the oracle is leader) in the outcome generation protocol. All phases may additionally transition to the respective NEW-EPOCH phase via a newEpochStart event, this is not shown.

Every round of a follower is structured into (follower-) phases from a set $\Phi$={NEW-EPOCH, NEW-ROUND, SENT-OBSERVATION, SENT-PREPARE, SENT-COMMIT and obeys the phase transitions shown in FIG. 5a. The leader, concurrently to acting as a follower, also progresses according to the leader-phases from a set $\Delta$=NEW-EPOCH, SENT-EPOCHSTART, SENT-ROUNDSTART, SENT-PROPOSAL, SENT-COMMIT, COMMITTED The leader operates according to the phase transitions of FIG. 5b.

A round may fail due to network delays or when the leader does not behave correctly. For example, the leader may send out conflicting PROPOSAL messages. Therefore, some oracle may not commit any outcome during the duration of a round. Such liveness violations are caught by the pacemaker protocol, because no progress events are emitted. While the pacemaker protocol ensures that eventually all correct oracles are in the same epoch, it does not ensure consistency of the committed outcomes across epochs. To this end, at the beginning of a new epoch, all oracles send to the new epoch leader an EPOCH-START-REQ message with their highest certified outcome $O_{cert}$ and its corresponding sequence number $sn_{cert}$. By certified outcome we denote an outcome for which the oracle has a prepare or commit quorum certificate (QC), i.e. a BFT quorum of distinct, signed PREPARE or COMMIT messages. An oracle $p_i$ sends a certified outcome with a prepare QC for sequence number sn, if there exists no sn'≥sn for which $p_i$ has a commit QC. Otherwise it sends the outcome with the highest commit QC. In detail, $p_i$ sends a message

[EPOCH-START-REQ, e, qcTag, $sn_{cert}$, $O_{cert}$, QC, σ]

where e is the new epoch;

qcTag is a flag indicating if the quorum certificate consists of PREPARE or COMMIT messages;

$sn_{cert}$ is the highest sequence number for which an outcome has been prepared or committed, whichever is higher;

$O_{cert}$ is the highest certified outcome;

QC the highest prepare or commit quorum certificate; and $σ_i$ is a signature of $p_i$ on the string $e\|sn_{cert}\|qcTag$.

The leader, upon gathering $$\left\lceil \frac{n+f+1}{2} \right\rceil$$

valid EPOCH-START-REQ messages, determines a quorum certificate highQC for the new epoch to justify $sn=sn_{high}$ as the highest sequence number for which an outcome could have been committed and sends an EPOCH-START message to all oracles. In detail, $sn_{high}$ is the highest certified sequence number among the valid EPOCH-START-REQ messages that the leader received; this means it is safe to start the first round of the new epoch with sequence number $sn_{high}+1$. The EPOCH-START message consists of e, the new epoch;

$sn_{high}$, the highest sequence number that could have been committed;

highQCTag, denoting whether the highest quorum certificate is a prepare or commit quorum certificate;

$O_{highCert}$, the outcome that corresponds to $sn_{high}$;

highQC, the highest prepare or commit quorum certificate among the $$\left\lceil \frac{n+f+1}{2} \right\rceil$$

EPOCH-START-REQ messages, which justifies $O_{highCert}$ and $sn_{high}$; and highQCProof, a BFT quorum of tuples ($sn_{cert}$, $qcTag_i$, $σ_i$), where $σ_i$ is the signature of $p_i$ on $e\|sn_{cert}\|qcTag_i$ and $qcTag_i$ indicates if $p_i$ sent a prepare of commit quorum certificate.

An oracle $p_i$, upon receiving a valid [EPOCH START, e, $sn_{high}$, qcTag, $O_{highCert}$, highQC, highQCProof] message for epoch e with a commit quorum certificate (qcTag=COMMIT), commits highCertOutcome to $sn_{high}$, if it has not done so, passes ($sn_{high}$, $O_{highCert}$) to the report attestation protocol, and then starts accepting ROUND-START messages for the next epoch. Otherwise, the EPOCH-START message contains a prepare quorum certificate (qcTag=PREPARE) for $sn_{high}$ and $O_{highCert}$. In this case, $p_i$ sends the message [PREPARE, e, highSn, $σ_i$] with $σ_i$ being its signature on $PREPARE\|e\|sn_{high}\|O_{highCert}$ to all oracles.

Intuitively, if $sn=sn_{high}+1$ is the lowest sequence number for which there exists no prepare quorum among $$\left\lceil \frac{n+f+1}{2} \right\rceil$$

EPOCH-START messages, then no correct oracle could have committed any outcome for sn, as there exist not enough oracles that could have sent a COMMIT message for sn. Therefore, sn+1 is free to assign a new outcome to. Moreover, no correct oracle could have prepared an outcome $O/=O_{highCert}$ for $sn_{high}$, since there exists at least a prepare quorum certificate for $O_{highCert}$ and, thus, no correct oracle could have committed $O/=O_{highCert}$ for highSn in a previous epoch. Therefore, it is safe to send a PREPARE message with outcome $O_{highCert}$ for $sn_{high}$ in the new epoch. Finally, upon receiving a valid commit certificate for highSn and $O_{highCert}$, an oracle can directly commit, as any set of $$\left\lceil \frac{n+f+1}{2} \right\rceil$$

EPOCH-START-REQ messages will contain at least one prepare certificate for $O_{highCert}$ and $sn_{high}$, and, therefore, no outcome different than $O_{highCert}$ can be prepared, and hence committed, for $sn_{high}$ in the new epoch.

The report attestation protocol is also run continuously by every oracle. It receives (sequence number, certified outcome) pairs from the outcome generation protocol, converts them into separate reports, gathers signatures on each report and thereby attests each report, and passes every attested report individually to the transmission protocol. Details of the report attestation protocol are shown in Algorithm 12 below, and described immediate below.

The outcome generation protocol passes a sequence number, certified outcome pair (sn, CO) to the report attestation protocol through a committedOutcome(sn, CO) event. The certified outcome CO is the committed outcome O along with the commit quorum certificate for O, i.e., a BFT quorum of distinct signed COMMIT messages for O from the same epoch.

When some oracle $p_i$ receives CO from the outcome generation protocol, it converts it into a vector of reports R by calling the reports(sn, O) plugin function. It then signs each report in the array and sends a [REPORT-SIGS, sn, O, Σ] message to all oracles, where Σ is the vector of report signatures.

When an oracle $p_i$ has received f+1 REPORT-SIGS messages for some sequence number sn, it first checks if it has the certified outcome for sn locally. If not, it asks other oracles for it as follows. Oracle $p_i$ creates a random permutation of the f+1 oracles that have-sent a REPORT-SIGS message for sn and starts asking them one by one for the certified outcome for sn. It repeats this step periodically, every $\Delta_{req\ cert\ commit}$, by sending one [CERTIFIED-COMMIT-REQ, sn] at a time, until it receives the certified outcome. The randomized order serves to balance the load among the oracles. When a correct oracle $p_j$ receives a [CERTIFIED-COMMIT-REQ, sn] message from $p_i$, it sends to $p_i$ the corresponding certified outcome if it has not already done so. Notice that every set of the f+1 oracles includes at least one correct oracle $p_c$. Therefore, $p_i$ will eventually obtain the certified outcome from $p_c$ or through a committedOutcome(sn, CO) event.

When the certified outcome CO for sn is locally available at $p_i$ together with f+1 valid REPORT-SIGS for each report r in the vector of reports derived from CO, then $p_i$ creates an attestation for the report. The attested report includes, along with r, the sequence number sn of the corresponding outcome O, the position of r in the vector of reports as returned by reports(sn, O), the vector of f+1 signatures for r and the vector of the oracle identities that produced the f+1 signatures. The protocol then invokes the transmission protocol with the attested report via an attestedReport event.

The outcome generation protocol guarantees that at least $$\left\lceil \frac{n+f+1}{2} \right\rceil - f \geq f+1$$

correct oracles commit an outcome for each sequence number. Therefore, it is guaranteed that eventually at least f+1 oracles will send a valid REPORT-SIGS message for each sequence number and every correct oracle will invoke the transmission protocol for all reports obtained from the outcome committed to every sequence number.

Note that though outcomes are already signed in PREPARE and COMMIT messages during the outcome generation protocol, we opt to signing each report that corresponds to the outcome separately for two reasons. First, the outcome generation protocol requires $$\left\lceil \frac{n+f+1}{2} \right\rceil$$

oracles to sign each PREPARE and COMMIT message in order to preserve consistency. However, using attestations with $\lceil n+f+1/2 \rceil$ signatures is more expensive in space consumption and verification time than with the f+1 signatures gathered by the report attestation protocol. Second, splitting the outcome into separate reports allows for transmitting each report in a dedicated transaction, which gives applications more flexibility.

There is a trade-off between the cost of attestation verification per report and the flexibility of transmitting each report in a single transaction. Therefore, the reports plugin function may also chose to batch multiple logically related reports into a single one. This is the reason why the conversion of an outcome to a vector of reports is configurable.

The transmission protocol forms the interface between the offchain reporting protocol and the blockchain running the smart contract C. This protocol also runs continuously and concurrently to the other protocols. Algorithm 13 below is an example of the logic responsible for transmitting a report a resulting from an outcome, produced by Algorithms 8-11 and attested in Algorithm 12, to C. It receives one attestedReport(a) event for every report a attested by the attestation protocol (Algorithm 12) and then creates a suitable transaction containing a and submits this to C. Under ideal conditions, the report attestation algorithm starts the transmission protocol at roughly the same time across all oracles.

Algorithm 12 Report attestation protocol (executed by every oracle $p_i$)
state availableCertOutcomes←{ }: maps a sequence number to a certified outcome missingOutcomes←Ø: a set of sequence numbers for the outcome is missing oraclesWithCertOutcomes←{ }: maps a sequence number to a randomized queue of oracle IDs sentCertCommit←{ }: maps a sequence number to a set of oracle IDs to which CERTIFIED-COMMIT has been sent reports←{ }: maps a sequence number to a vector of reports reportSigMsgs←{ }: maps a sequence number to a vector of REPORT-SIGS messages per oracle ID completeOutcomes←Ø: set of sequence numbers corresponding to outcomes whose reports attestation completed
upon event committedOutcome(sn, CO) do if availableOutcomes[sn]=⊥ then availableCertOutcomes[sn]←CO
processCertifiedOutcome(sn, CO) //sends a REPORT-SIGS message to all upon receiving message [REPORT-SIGS, sn, Σ] from $p_j$ s.t. reportSigMsgs[sn][j]=⊥∧sn∈/completeOutcomes do reportSigMsgs[sn][j]←[REPORT-SIGS, sn, Σ] if reports[sn]=⊥ then $$\text{if}|\{p_{j'} \in \mathcal{P} \mid$$

$$reportSigMsgs[sn][j'] = [REPORT-SIGS, sn, \sum] \neq \perp$$

$$\wedge \wedge_{k=1}^{|reports[sn]|} \sum[k] \neq \perp \wedge_{verifyAttest_{ij}(sn, reports}[sn][k]), \sum[k])\}| = f+1$$

completeOutcomes←completeOutcomes∪{sn}R←reports[sn] for pos∈{1, ..., |R|} do k←1
for $p_j$∈P s.t. reportSigMsgs[sn][j']/=⊥∧reportSigMsgs[sn][j']=[REPORT-SIGS, sn, Σ] do (J[k], T[k])←(j', Σ[j'])// collects the attestations attestedReport←(sn, pos, R[pos], J, T)
k←k+1
invoke event attestedReport(attestedReport) //see transmission protocol in Alg. 8 upon ∃sn s.t. |{$p_j$∈ $\mathcal{P}$ $|_{reportSigMsgs}$[sn][j]≠⊥}|=f+1∧$_{reports[sn]=⊥∧sn \in /missingOutcomes}$ do for $p_j$∈randomperm({$p_j$∈ $\mathcal{P}$ $|_{reportSigMsgs}$[sn][j]≠⊥}) do oracles WithCertOutcomes.enqueue($p_j$)
missingOutcomes←missingOutcomes∪{sn}  schedule missingOutcome(sn) at now
upon event missingOutcome(sn) s.t. reports[sn]=⊥ do send message [CERTIFIED-COMMIT-REQ, sn] to oracles WithCertOutcomes.dequeue( ) schedule missingOutcome(sn) at now+$\Delta_{req\ cert\ commit}$
upon receiving message [CERTIFIED-COMMIT-REQ, sn] from $p_j$ s.t. availableCertOutcomes[sn]/=⊥
∧$p_j$ ∈/sentCertCommit[sn] do sentCertCommit[sn]←sentCertCommit[sn]
∪{$p_j$} send message [CERTIFIED-COMMIT, sn, availableCertOutcomes[sn]]
to $p_j$
upon receiving message [CERTIFIED-COMMIT, sn, CO] from $p_j$ s.t. availableCertOutcomes[sn]=⊥ do (outcome, QC)←CO
if validQC(sn, outcome, COMMIT, QC) then//see outcome generation protocol in Alg. 4
availableCertOutcomes[sn]←CO processCertifiedOutcome(sn, CO)
function processCertifiedOutcome(sn, CO)

(outcome,)←CO reports[sn]←reports(sn, outcome)//reports[sn] stores a vector of reports k←|reports[sn]|
$\Sigma \leftarrow [\bot]^k$ for j=1, ..., k do
$\Sigma[j] \leftarrow$ signAttest$_i$(sn, reports[sn][j]) send message [REPORT-SIGS, sn, $\Sigma$] to all $p_j \in P$ The algorithm first filters incoming attested reports to avoid redundant transmissions and to reduce gas costs. In particular, we aim to protect against a scenario where many similar reports are produced in quick succession. In such a case, we only want to transmit the first such report and discard the following ones. This can be specified for a reporting protocol through two plugin functions should-accept-attested-report(a) and should-transmit-accepted-report(a), where a denotes an attested report.

Algorithm 8 Transmission protocol (executed by every oracle $p_i$).
state timer $T_{transmit}$, initially stopped: delays until next report should be transmitted
upon event attestedReport(attestedReport) do
(sn, pos,)←attestedReport
should-accept-attested-report(attestedReport)
if then
$\Delta_{transmit} \leftarrow$ transmit-delay(i, sn, pos)
schedule scheduledReport(attestedReport) at now+$\Delta_{transmit}$
upon event scheduledReport(attestedReport) do if should-transmit-accepted-report(attestedReport)
then send blockchain transaction with attestedReport to C
function transmit-delay(i, sn, pos)
$\pi \leftarrow F_x$(sn∥pos)//derive pseudorandom permutation of $\{1, \ldots, n\}$ k←k such that $\Sigma_{j=1}^{k-1} s_j < \pi(i) \leq \Sigma_{j=1}^{k} s_j$// assuming $s_0=0$
return $k \cdot \Delta_{stage}$ The first filter, should-accept-attested-report(a), is invoked immediately after a has been submitted to the transmission protocol. The second filter, should-transmit-accepted-report(a), gives the protocol another chance to save transaction fees. A plugin may use this, for instance, to check whether C has already recorded a and made the transmission obsolete. This check is called immediately before each transmission.

To actually transmit the reports, the algorithm proceeds in stages and is globally parameterized by a stage duration $\Delta_{stage}$ and a schedule $S=(s_1, \ldots, s_{|S|})$. In stage i, there are $s_i$ distinct and randomly selected oracles that attempt to transmit the report to C. The transmitting oracles are determined by a pseudorandomly chosen permutation $\pi$ of $\{p_1, \ldots, p_n\}$, which ensures that each oracle is chosen at most once as a transmitter.

In the transmission schedule, stage i starts after duration (i−1) $\Delta_{stage}$ has elapsed. Writing $t_0=0$ and $t_k=\Sigma_{j=1}^{k} s_j$, this means that in stage k, the oracles on position $t_{k-1}+1, \ldots, t_{k-1}+s_k$ of $\pi$ are supposed to transmit. By requiring that $P_{iSi} > f$, we can ensure that there is at least one correct node that will transmit to C. The timeouts should be such that periods in which reports with different sequence numbers should be transmitted may overlap substantially, i.e., a report with a higher sequence number may arrive before many oracles had a chance to transmit the previous one.

The value of $\Delta_{stage}$ must be set with respect to all other timeout values and in accordance with the block interval on the blockchain running C. Typically it is a multiple of the block interval on the chain. See Section 6.6 for a discussion of the timing parameters.

Algorithm 13 Transmission protocol (executed by every oracle $p_i$).
state timer $T_{transmit}$, initially stopped: delays until next report should be transmitted
upon event attestedReport(attestedReport) do
(sn, pos,)←attestedReport
should-accept-attested- if then
report(attestedReport) $\Delta_{transmit} \leftarrow$ transmit-delay(i, sn, pos)
schedule scheduledReport(attestedReport) at now+$\Delta_{transmit}$
upon event scheduledReport(attestedReport) do if should-transmit-accepted-report(attestedReport)
then send blockchain transaction with attestedReport to C
function transmit-delay(i, sn, pos)
n←$F_x$(sn∥pos)//derive pseudorandom permutation of $\{1, \ldots, n\}$ k←k such that $\Sigma_{j=1}^{k-1} s_j < \pi(i) \leq \Sigma_{j=1}^{k} s_j$// assuming $s_0=0$
return $k \cdot \Delta_{stage}$ For the transmission protocol to achieve its goal, we require that a correct oracle will always be able to get a transaction included in the blockchain within $\Delta_{stage}$ time. This assumes that (1) miners are actively mining the blockchain and including transactions from their mempools according to the usual gas price auction dynamics and that (2) the oracle appropriately sets (or escalates) its gas price bid to have the transmission transaction included in the blockchain. These assumptions may be violated in practice, e.g., when the blockchain is severely congested. In such cases, transmission transactions will still be included eventually, but later and at a higher total gas cost than modeled here.

The selection of transmitting oracles occurs with a pseudorandom function $F_x: \{0, 1\}^* \to Sym(n)$, where x is a secret seed known only to oracles and Sym(n) is the set of permutations of $\{1, \ldots, n\}$. Given the (implicit) protocol identifier, report sequence number, and position, $F_x$ deterministically derives a permutation of the node set. As with the leader function described in Section 6.2, the seed x should not be known to the oracles before they are committed to their indexing in $\{p_1, \ldots, p_n\}$, so that a malicious coalition cannot arrange themselves to dominate the early parts of the schedule.

Faulty oracles may misbehave and ignore the global transmission schedule given by the algorithm, e.g., because their clock is malfunctioning. The defense against this behavior is purely economical. The owner can monitor the transactions sent to C and check that oracles follow the transmission schedule. We expect the owner to remove any oracles that consistently misbehave (i.e., submit too late or too early) from the protocol, preventing them from earning future reporting and transmission fees. Since such an attack threatens neither safety nor liveness properties, and we expect the ratio between earnings from ongoing protocol participation to earnings from such an attack (prior to discovery) to be high, this defense should suffice in practice.

Notice that all protocols are functional under partial synchrony only to the extent that the timing characteristics of the network after GST are reflected by the chosen constants. Since they are fixed and not determined adaptively with respect to an unknown $\Delta$, the protocol does not formally adhere to partial synchrony.

A unified summary of the constants used in the protocol description and analysis is set forth below.

Global
- n is the number of oracles. The current implementation assumes n≤31.
- $\Delta$ is the assumed upper bound on communication latency during periods of synchrony. The choice of all other time constants is constrained by this. In typical WAN deployments, this value is on the order of hundreds to thousands of milliseconds. Note that $\Delta$ plays a role for the analysis but is never explicitly used as a configuration parameter.

Pacemaker
- $\Delta_{process}$ denotes a maximum on the processing delay of any function implemented by a reporting plugin. In practice, this value is typically on the order of tens to hundreds of milliseconds.
- $\Delta_{progress}$ is the time during which a leader must achieve progress or be replaced. The outcome generation protocol defines "progress" as committing an outcome for at least the first round of some epoch e. The $\Delta_{progress}$ parameter must therefore be set to a value such that, after GST, from the time that the first correct oracle initializes epoch e, the leader of the epoch has enough time to initialize e and make $2f+1$ correct oracles commit the outcome of the first round of e. Consequently, $\Delta_{progress}$ must always be greater or equal than $\Delta_{round}+\Delta_{grace}$.
- $\Delta_{resend}$ is the interval at which nodes resend NEW-EPOCH-WISH messages.

Atomic outcome generation
- $\Delta_{initial}$ is the time during which, after GST, a leader must ensure that n–f oracles start the first round of outcome generation or be replaced. The $\Delta_{initial}$ parameter must therefore be set to a value such that form the time that the first correct oracle initializes epoch e, the leader has enough time to initialize e and gather $$\left\lceil \frac{n+f+1}{2} \right\rceil$$

EPOCH-START-REQ messages and for all correct oracles to receive the corresponding.
EPOCH-START message from the leader. Moreover, $\Delta_{initial}$ should be shorter than $\Delta_{progress}$, as this allows oracles to terminate an epoch quickly in case the leader is not responsive right at the beginning of the epoch.
- $\Delta_{round}$ is the minimum waiting time of the leader to start a new round. This value is useful for limiting the speed at which rounds progress, e.g., to enable more precise control of overall resource consumption.
- $\Delta_{grace}$ is the duration of the grace period during which observations of delayed oracles are still considered by the leader, even after it has gathered enough of them. This value is useful in cases where, in the happy path, one wants to give more oracles than strictly needed an opportunity to contribute observations to the outcome.
- $\rho$ is the maximum number of rounds in an epoch.

Transmission.
- $\Delta_{stage}$ is used to stagger stages of the transmission protocol. Multiple blocks should be mineable on the blockchain hosting C in this period.

Domain separators. All hash and signature computations have to use proper domain separators, which we omit from the above protocol description for notational clarity. Domain separators include:

Protocol identifier.

Address of contract C

A counter of protocol instances (maintained by C)

Blockchain identifier (e.g. for Ethereum mainnet).

Set of oracles P

Table 1 below illustrates example values for constants for the reporting plugin for numerical values. We assume that we are running over a WAN with high-quality networking between oracles and that the target blockchain produces multiple blocks per second.

| Constant | Value |
| --- | --- |
| typical $\Delta$ (implicit) | 150 milliseconds |
| $\Delta_{process}$ | 50 milliseconds |
| $\Delta_{progress}$ | 2 seconds |
| $\Delta_{resend}$ | 5 seconds |
| $\Delta_{initial}$ | 500 milliseconds |
| $\Delta_{round}$ | 250 milliseconds |
| $\Delta_{grace}$ | 50 milliseconds |
| $\rho$ | 10 rounds |
| $\Delta_{stage}$ | 2 seconds |

The reporting plugin supports the median of prices or other numerical values. Using the median among more than 2f observations ensures that the reported value is plausible in the sense that faulty oracles cannot move it outside the range of observations submitted by correct oracles. The range of blocks to calculate the median is such that any two reports with sequence numbers sn and sn+1 contain median prices for contiguous ranges of blocks. The range of blocks refers to the blockchain B on which contract C runs. Put differently, for each block height in B, there exists a unique report. The implementation of the plugin is described in Algorithm 14.

---

Algorithm 14 Reporting plugin implementation for numerical (ordered) values (executed by every $p_i$).

---

```
function query(O_prev, sn) return ⊥            function observation(O_prev, sn, Q)
    t ← now( )                                      // the current local time at p_i
    d ← value( )                                    // the current realization at p_i of the reported (data) value
    b ← blockheight( ) return (t, d, b)   function  // the height of current tip of the blockchain
valid-observation( O_prev, sn, Q, v)
    return valid(v)                                 // valid( ) checks if the observation is well-formed
    function observation-quorum() return 2f + 1
function outcome(O_prev, sn, Q, B)
    t ← median({t| ((,(t', -- ,    )) ∈ B})        // recall B is a vector of index-observation pairs
    d ← median({d'|( , ( , d', -- )) ∈ B})
```

Algorithm 14 Reporting plugin implementation for numerical (ordered) values (executed by every $p_i$).

```
if sn = 1 then                          // "genesis" outcome
  ( „b'_start, b'_end, ) ← (0, 0, 0, 0, 0)
else
  (, , b'_start, b'_end, ) ← O_prev if b'_start ≤ b'_end then b_start ← b_end + 1
  else
  b_start ← b'_start
  (
  b_end ← median({bl(. . . , (. . . , . . . , b)) ∈ B})
  shouldreport ← (b_start ≤ b_end) O ←
(t, d, b_start, b_end, shouldreport) return O
  function reports(sn, O)
  (t,d,b_start, b_end, shouldreport) ← O if
shouldreport then
  return [(t,d,b_start, b_end)] else     // a vector with a single report
  return [⊥]                             // an empty vector
  function should-accept-attested-report(a)
  (. . . , . . . , r, . . . , . . . ) ← a
  (. . . , . . . , . . . , b_end) ← r
  return ¬report-for-height(b_end) function should-transmit-accepted-report(a)
  (. . . , . . . , r, . . . , . . . ) ← a
  (. . . , . . . , . . . , b_end) ← r
  return ¬report-for-height(b_end)
  function report-for-height(h)
  // Queries the smart contract C and returns TRUE if and only if there exists a report for block height h.
```

Each observation includes an observed value d, the timestamp t of the observation, and the height b of the tip of the blockchain B when the observation is made. The valid-observation( ) function ensures that the observations are well formed. A malformed observation indicates a faulty oracle; therefore, such observations should be ignored.

For reporting numbers from a totally ordered domain, the reporting plugin uses a median computation in the outcome( ) function. In this way, it prevents Byzantine oracles from significantly affecting the reported values by introducing too big or too small values in the observation set. Not only the observed value (d) in a report is obtained as the median of observations, also the timestamp (t) and the block height (b) are calculated as medians. In particular, the observation-quorum( ) is set to 2f+1, such that for d, t, and b, respectively, the corresponding median observation-quorum( ) lies in an interval of two values that have been observed by correct oracles. The outcome( ) function also ensures that the range of blocks $\{b_{start}, \ldots, b_{end}\}$ covered by the report directly follows the range of blocks from the previous report $$\{b'_{start}, \ldots, b'_{end}\},$$

i.e., such that $$b_{start} = b'_{end} + 1.$$

Moreover, the upper limit $b_{end}$ of the block range in the current report should be at least equal to the lower limit $b_{start}$. If the median b of the reported block numbers of the blockchain tip is greater or equal to $b_{start}$, then $b_{end}$ is assigned b. If b is less than $b_{start}$, then the plugin function indicates that no report should be generated for this round. This is captured by the shouldreport flag, which is a field of the outcome.

The reports( ) function transforms the committed outcome into a vector of reports. Each outcome is transformed into a vector of at most one report, according to the shouldreport flag. The two plugin functions should-accept-attested-report( ) and should-transmit-accepted-report( ) are relevant for transmission. Recall that should-accept-attested-report( ) performs its check whenever the transmission protocol is invoked and should-transmit-accepted-report( ) performs its check right before the oracle transmits the attested report.

Both functions aim to prevent that a report r for block range $\{b_{start}, \ldots, b_{end}\}$ is transmitted to smart contract C if any report for some block height in $\{b_{start}, \ldots, b_{end}\}$ has already been finalized on blockchain B. Since the protocol guarantees that no two different attested reports have overlapping block ranges, it suffices to check that no report is finalized in B for the upper limit of the block range $b_{end}$. To that end both plugin functions query contract C.

Figure 6:
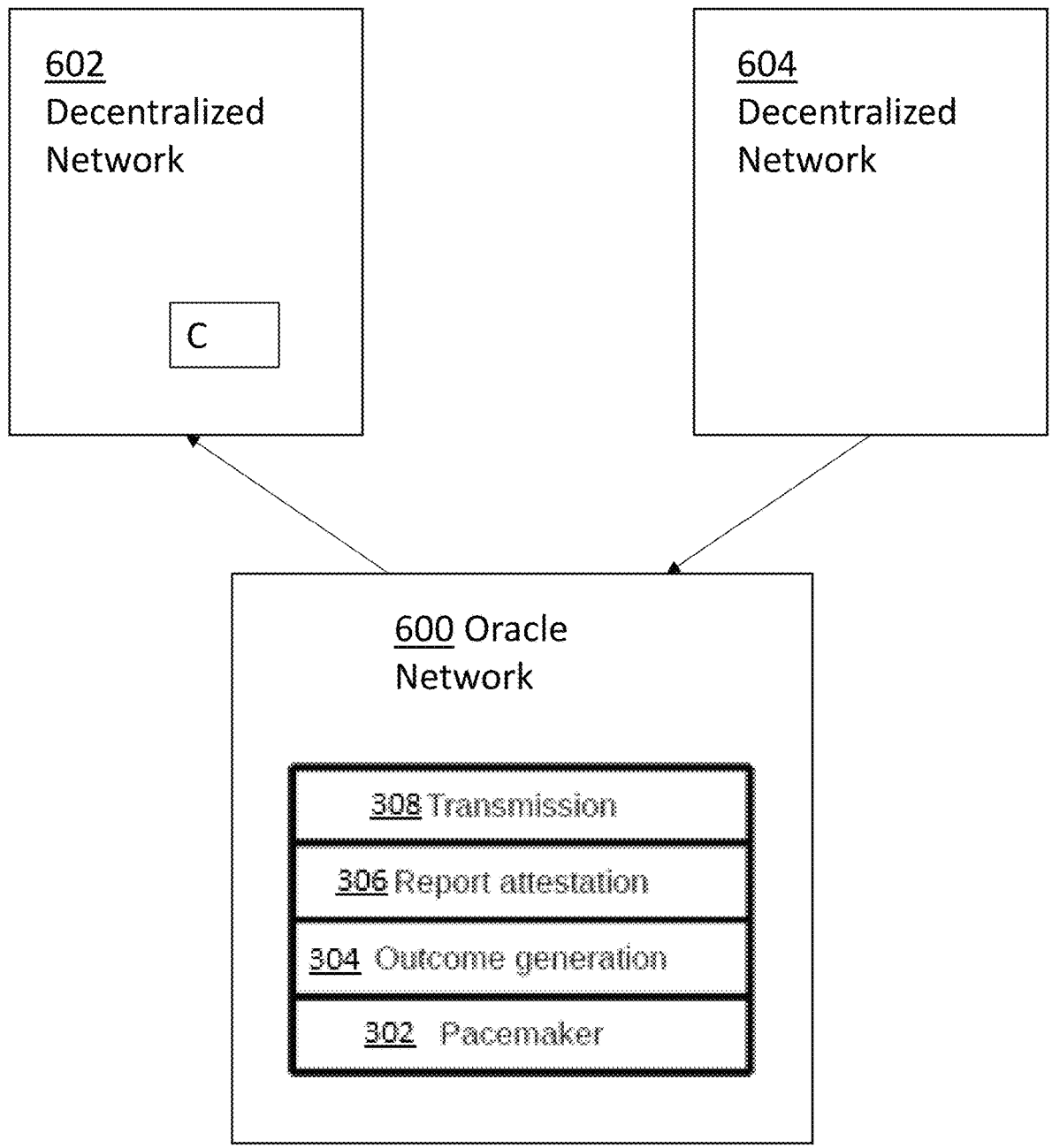
FIG. 6 illustrates a computing architecture in which information from one decentralized network, e.g. a first blockchain, is transmitted to a second decentralized network in accordance with disclosed implementations.

FIG. 6 illustrates a computing architecture in which information from one decentralized network, e.g. a first blockchain, is transmitted to a second decentralized network, e.g. a second blockchain. As shown in FIG. 6, oracle network 600, which can be similar to oracle network 100 of FIG. 1 and can include nodes that each execute the protocol modules of FIG. 4, receives observations from one or more nodes of decentralized network 604 in the manner described above. Further, oracle network 600 creates and transmits reports to decentralized network 602, having a smart contract C executing thereon, in the manner described above. The observations can relate to any activity, such as transactions on decentralized network 604.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for providing secure information from a remote network to a decentralized computing environment, the method comprising:
executing a smart contract on plural on-chain nodes of the decentralized computing environment, wherein the smart contract specifies a network of plural oracle nodes of an offchain remote computing network, wherein the offchain remote computing network includes at least one of a centralized or a decentralized network and wherein the oracle nodes each have a collection of keys that define an identity of the corresponding node;
periodically receiving, by each oracle node, at least one observed value from the offchain remote computing network, wherein the at least one observed value corresponds to the secure information;
wherein the oracle nodes communicate with each other and with the smart contract using a report protocol defined by at least one reporting plugin module, wherein each of the at least one reporting plugin modules is a stateful object, and wherein the at least one reporting plugin module defines four algorithms including:
a pacemaker algorithm configured to periodically initiate a new epoch that triggers an instance of the outcome generation algorithm;
an outcome generation algorithm configured to aggregate the observed values of the oracle nodes into outcomes;
a report attestation algorithm configured to convert the outcomes into a report; and
a transmission algorithm configured to selectively transmit the report to the smart contract; and
exposing by the smart contract, the report to consuming smart contracts executing on the decentralized computing environment.

2. The method of claim 1, wherein, prior to exposing the aggregation values to the consuming smart contracts, the smart contract validates the report in accordance with validity conditions which depend on the implementation of the at least one reporting plugin.

3. The method of claim 1, wherein the pacemaker algorithm is executed by a leader oracle node selected from the oracle nodes and comprises: receiving a startepoch event from the pacemaker module at the leader oracle node that is selected from the oracle nodes;
initiating a new instance of the outcome generation algorithm;
requesting the observations from the other oracle nodes; and
upon expiration of a predetermined time, triggering the report attestation algorithm.

4. The method of claim 1, wherein the outcome generation algorithm comprises:
a query function, executed by the leader oracle node, in which a query is sent to the other oracle nodes to specify what data the other oracle nodes should observe;
an observation function in which the other oracle nodes each generate a signed observation satisfying the query;
a validity function which determines validity of each observation;
an outcome function which aggregates a list of observations by the other oracles to define the outcome.

5. The method of claim 1, wherein the report attestation algorithm is executed by each oracle node and comprises:
receiving sequence number/certified outcome pairs from the outcome generation protocol;
converting the pairs into separate reports;
gathering signatures on each report to thereby attest to each report; and
passing the attested reports to the transmission algorithm.

6. The method of claim 1, wherein the transmission algorithm comprises:
before transmitting a report to the smart contract, checking whether the report has
previously been transmitted to the smart contract; and
not transmitting the report when it has previously been transmitted to the smart contact.

7. The method of claim 1, wherein the decentralized network is a blockchain network and the off chain remote computing network is a blockchain network.

8. A computing system for providing secure information from a remote network to a decentralized computing environment, the system comprising:
at least one computer processor; and
at least one memory device operatively coupled to the at least one computer processor and having computer readable instructions stored thereon which, when executed by the at least one processor, cause the at least one computer processor to carry out a method comprising:
executing a smart contract on plural on-chain nodes of the decentralized computing environment, wherein the smart contract specifies a network of plural oracle nodes of an off-chain remote computing network, wherein the offchain remote computing network includes at least one of a centralized or a decentralized network and wherein the oracle nodes each have a collection of keys that define an identity of the corresponding node;
periodically receiving, by each oracle node, at least one observed value from the offchain remote computing network, wherein the at least one observed value corresponds to the secure information;
wherein the oracle nodes communicate with each other and with the smart contract using a report protocol defined by at least one reporting plugin module, wherein each of the at least one reporting plugin modules is a stateful object, and wherein the at least one reporting plugin module defines four algorithms including:
a pacemaker algorithm configured to periodically initiate a new epoch that triggers an instance of the outcome generation algorithm;
an outcome generation algorithm configured to aggregate the observed values of the oracle nodes into outcomes;
a report attestation algorithm configured to convert the outcomes into a report; and
a transmission algorithm configured to selectively transmit the report to the smart contract; and
exposing by the smart contract, the report to consuming smart contracts executing on the decentralized computing environment.

9. The system of claim 8, wherein, prior to exposing the aggregation values to the consuming smart contracts, the smart contract validates the report in accordance with validity conditions which depend on the implementation of the at least one reporting plugin.

10. The system of claim 8, wherein the pacemaker algorithm is executed by a leader oracle node selected from the oracle nodes and the method further comprises:

receiving a startepoch event from the pacemaker module at the leader oracle node that is selected from the oracle nodes;

initiating a new instance of the outcome generation algorithm;

requesting the observations from the other oracle nodes; and upon expiration of a predetermined time, triggering the report attestation algorithm.

11. The system of claim 8, wherein the outcome generation algorithm comprises:

a query function, executed by the leader oracle node, in which a query is sent to the other oracle nodes to specify what data the other oracle nodes should observe;

an observation function in which the other oracle nodes each generate a signed observation satisfying the query;

a validity function which determines validity of each observation;

an outcome function which aggregates a list of observations by the other oracles to define the outcome.

12. The system of claim 8, wherein the report attestation algorithm is executed by each oracle node and comprises:

receiving sequence number/certified outcome pairs from the outcome generation protocol;

converting the pairs into separate reports;

gathering signatures on each report to thereby attest to each report; and passing the attested reports to the transmission algorithm.

13. The system of claim 8, wherein the transmission algorithm comprises:

before transmitting a report to the smart contract, checking whether the report has previously been transmitted to the smart contract; and not transmitting the report when it has previously been transmitted to the smart contact.

14. The system of claim 8, wherein the decentralized network is a blockchain network and the off chain remote computing network is a blockchain network.

* * * * *